United States Patent
Chang

(10) Patent No.: US 10,333,396 B2
(45) Date of Patent: Jun. 25, 2019

(54) FOUR-PHASE CHARGE PUMP CIRCUIT

(71) Applicant: eMemory Technology Inc., Hsinchu (TW)

(72) Inventor: Wu-Chang Chang, Hsinchu County (TW)

(73) Assignee: eMemory Technology Inc., Hsinchu (TW)

( * ) Notice: Subject to any disclaimer, the term of this patent is extended or adjusted under 35 U.S.C. 154(b) by 0 days.

(21) Appl. No.: 16/149,069

(22) Filed: Oct. 1, 2018

(65) Prior Publication Data

US 2019/0165672 A1 May 30, 2019

Related U.S. Application Data

(60) Provisional application No. 62/590,402, filed on Nov. 24, 2017.

(30) Foreign Application Priority Data

Jul. 19, 2018 (TW) .............................. 107125016 A

(51) Int. Cl.
*G05F 1/10* (2006.01)
*H02M 3/07* (2006.01)
*H02M 1/36* (2007.01)

(52) U.S. Cl.
CPC ............... *H02M 3/07* (2013.01); *H02M 1/36* (2013.01)

(58) Field of Classification Search
CPC ............................... H02M 3/07; H02M 3/073
USPC .......................................................... 327/536
See application file for complete search history.

(56) References Cited

U.S. PATENT DOCUMENTS

| | | | | |
|---|---|---|---|---|
| 5,818,289 A * | 10/1998 | Chevallier | ............ | H02M 3/073 327/536 |
| 6,130,574 A * | 10/2000 | Bloch | ..................... | G11C 16/30 327/536 |
| 6,501,325 B1 | 12/2002 | Meng | | |
| 6,677,805 B2 * | 1/2004 | Shor | ..................... | H02M 3/073 327/536 |
| 6,888,400 B2 * | 5/2005 | Lin | ........................ | H02M 3/073 327/536 |
| 6,909,319 B2 * | 6/2005 | Wang | ..................... | H02M 3/073 327/534 |
| 7,342,438 B2 * | 3/2008 | Muneer | ................... | H02M 3/07 327/536 |

(Continued)

*Primary Examiner* — Kenneth B Wells
(74) *Attorney, Agent, or Firm* — JCIPRNET

(57) ABSTRACT

A four-phase charge pump circuit provided includes multiple boosting stages. Each boosting stage includes two branch charge pumps. Each branch charge pump includes a main pass transistor and a pre-charge transistor. Two ends of the main pass transistor serve as a first node and a second node of the branch charge pump respectively. A first end, a second end and a control end of the pre-charge transistor are coupled to a control end of the main pass transistor, a second node and a first node of the branch charge pump respectively. At least one boosting stage further includes two auxiliary start-up transistors. Two ends of each auxiliary start-up transistor are coupled to the control end of one main pass transistor and the second node of the branch charge pump respectively. A control end of each auxiliary start-up transistor is coupled to the control end of one main pass transistor.

16 Claims, 14 Drawing Sheets

(56) References Cited

U.S. PATENT DOCUMENTS

| | | | | |
|---|---|---|---|---|
| 7,595,682 B2* | 9/2009 | Lin | .................. | H02M 3/073 |
| | | | | 327/536 |
| 8,154,333 B2* | 4/2012 | Ker | .................. | G11C 5/145 |
| | | | | 327/536 |
| 8,674,749 B2 | 3/2014 | Tran et al. | | |
| 9,214,859 B2* | 12/2015 | Lin | .................. | H02M 3/07 |
| 9,509,213 B1* | 11/2016 | Yuan | .................. | H02M 3/07 |
| 9,923,459 B2* | 3/2018 | De Cicco | .................. | H02M 3/073 |
| 10,177,653 B2* | 1/2019 | Sassene | .................. | H04R 3/00 |

* cited by examiner

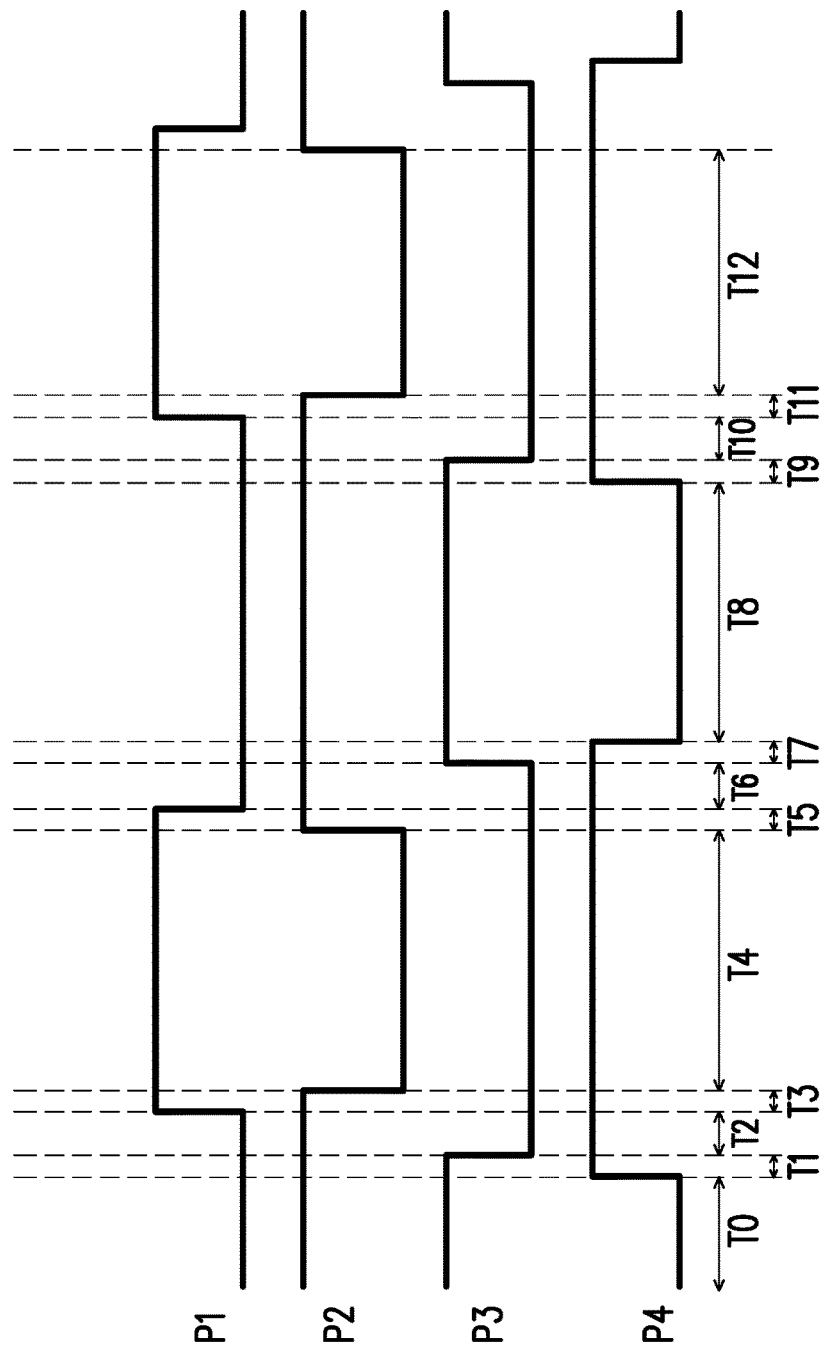

FOUR-PHASE CHARGE PUMP CIRCUIT

CROSS-REFERENCE TO RELATED APPLICATION

This application claims the priority benefit of U.S. provisional application Ser. No. 62/590,402, filed on Nov. 24, 2017, and Taiwan application serial no. 107125016, filed on Jul. 19, 2018. The entirety of each of the above-mentioned patent applications is hereby incorporated by reference herein and made a part of this specification.

BACKGROUND OF THE INVENTION

1. Field of the Invention

The invention relates to a charge pump circuit, and more particularly, relates to a four-phase charge pump circuit.

2. Description of Related Art

A charge pump circuit can provide a pump voltage with a higher voltage level based on a reference voltage. The voltage level of the pump voltage may be several times a voltage level of the reference voltage. The charge pump circuit is applicable to various electronic devices such as a nonvolatile memory, a display driver and the like.

In the conventional field, if the charge pump circuit cannot be started normally, the charge pump circuit may not be able to provide the pump voltage with normal voltage level. As a result, the electronic device using the charge pump circuit cannot function properly.

SUMMARY OF THE INVENTION

Accordingly, the invention provides a four-phase charge pump circuit, which can prevent a start-up failure from happening.

The four-phase charge pump circuit of the invention includes a plurality of boosting stages. The boosting stages are driven by a four-phase clock signal. Each of the boosting stages includes two branch charge pumps. Each branch charge pump includes a main pass transistor, a pre-charge transistor and two capacitors. A first end of the main pass transistor serves as a first node of the branch charge pump. A second end of the main pass transistor serves as a second node of the branch charge pump. The first node and the second node of the branch charge pump are connected to a previous boosting stage and a next boosting stage of the boosting stage respectively. A first end and a second end of the pre-charge transistor are coupled to a control end of the main pass transistor and the second node of the branch charge pump respectively. A control end of the pre-charge transistor is coupled to the first node of the branch charge pump. The two capacitors are coupled to the control end of the main pass transistor and the first node of the branch charge pump respectively. At least one boosting stage further includes two auxiliary start-up transistors. A first end and a second end of each auxiliary start-up transistor are coupled to the control end of the main pass transistor and the second node of one of the branch charge pumps. A control end of each auxiliary start-up transistor is coupled to the control end of the main pass transistor of one of the branch charge pumps.

The four-phase charge pump circuit of the invention includes a plurality of boosting stages. The boosting stages are driven by a four-phase clock signal. Each of the boosting stages includes two branch charge pumps. Each branch charge pump includes a main pass transistor, a pre-charge transistor and two capacitors. A first end of the main pass transistor serves as a first node of the branch charge pump. A second end of the main pass transistor serves as a second node of the branch charge pump. The first node and the second node of the branch charge pump are connected to a previous boosting stage and a next boosting stage of the boosting stage respectively. A first end and a second end of the pre-charge transistor are coupled to a control end of the main pass transistor and the first node of the branch charge pump respectively. A control end of the pre-charge transistor is coupled to the second node of the branch charge pump. The two capacitors are coupled to the control end of the main pass transistor and the first node of the branch charge pump respectively. A first end and a second end of each auxiliary start-up transistor are coupled to the control end of the main pass transistor and the first node of one of the branch charge pumps. A control end of each auxiliary start-up transistor is coupled to the control end of the main pass transistor of one of the branch charge pumps.

Based on the above, the four-phase charge pump circuit of the invention includes the auxiliary start-up transistors. The auxiliary start-up transistors can ensure that the main pass transistors of the four-phase charge pump circuit can be turned on and turned off normally such that the four-phase charge pump circuit can be started up properly to provide the pump voltage with normal voltage level.

To make the above features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 illustrates a waveform diagram of a four-phase clock signal applied in the four-phase charge pump circuits of FIG. 1A and FIG. 1B according to an embodiment of the invention.

DESCRIPTION OF THE EMBODIMENTS

In order to make content of the invention more comprehensible, embodiments are described below as the examples to prove that the invention can actually be realized. In addition, whenever possible, identical or similar reference numbers stand for identical or similar elements in the figures and the embodiments.

Figure 1A:
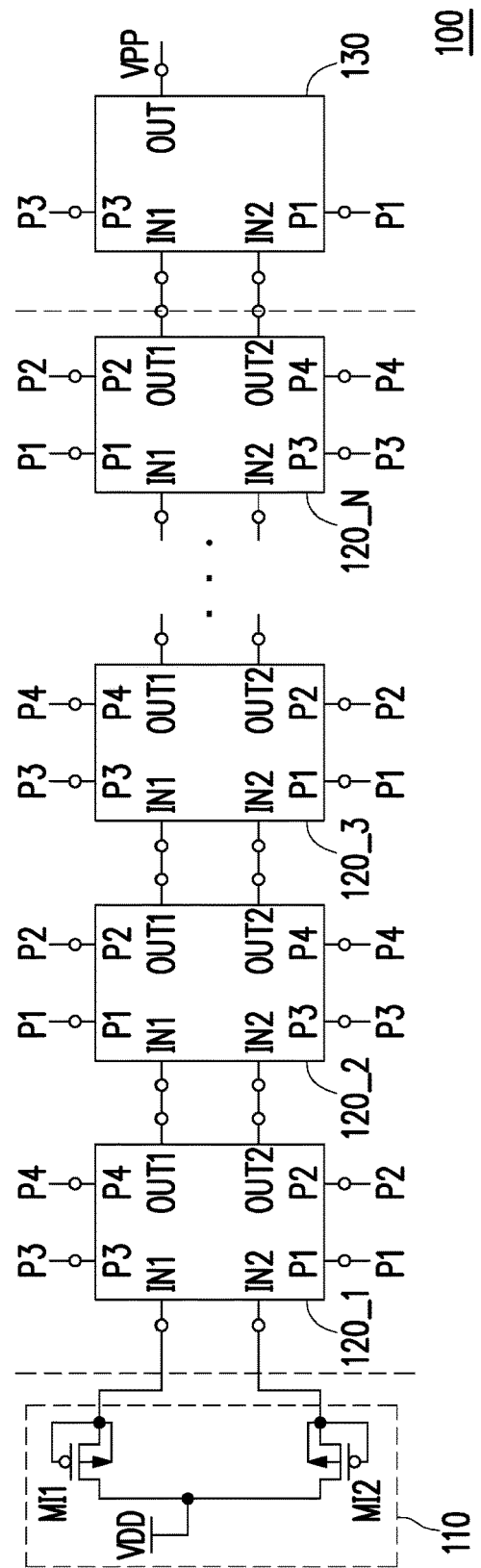
FIG. 1A is block diagram illustrating a four-phase charge pump circuit according to an embodiment of the invention.
Figure 1B:
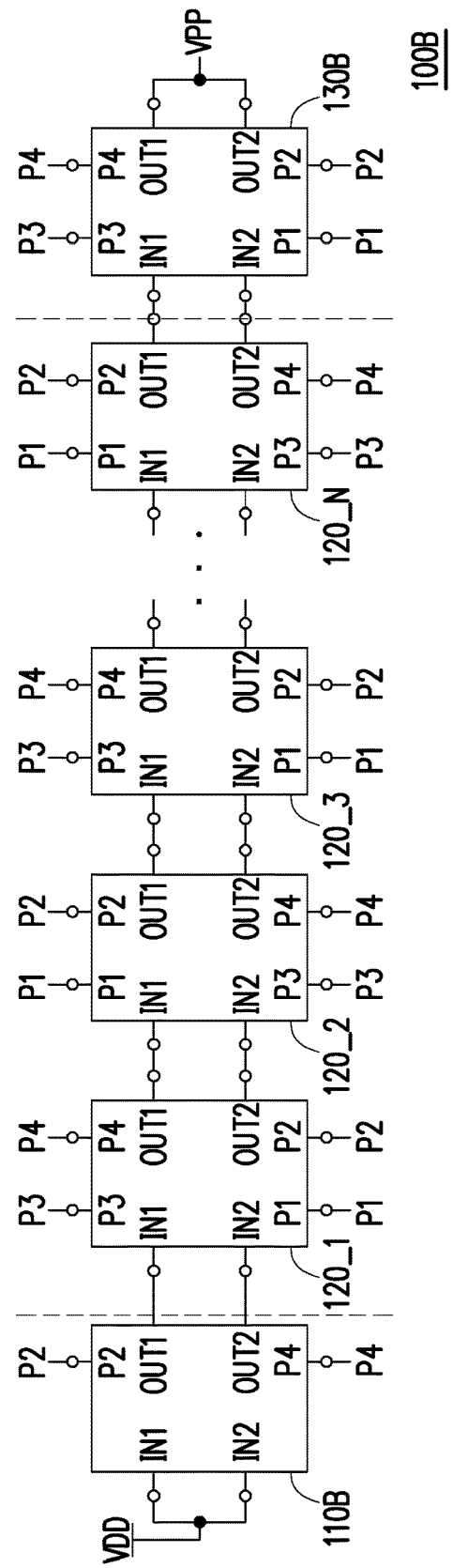
FIG. 1B is block diagram illustrating a four-phase charge pump circuit according to another embodiment of the invention.

FIG. 1A is block diagram illustrating a four-phase charge pump circuit according to an embodiment of the invention. FIG. 1B is block diagram illustrating a four-phase charge pump circuit according to another embodiment of the invention. FIG. 2 illustrates a waveform diagram of a four-phase clock signal applied in the four-phase charge pump circuits of FIG. 1A and FIG. 1B according to an embodiment of the invention. With reference to FIG. 1A and FIG. 2, a four-phase charge pump circuit 100 may include an input stage 110, a plurality of boosting stages 120_1 to 120_N and an output stage 130, where N is an positive integer greater than 1. The input stage 110, the boosting stages 120_1 to 120_N and the output stage 130 are serially connected in sequence. Here, each of the boosting stages 120_1 to 120_N is driven by four clock signals P1, P2, P3 and P4 of a four-phase clock signal shown by FIG. 2. In particular, phases of the clock signals P1, P2, P3 and P4 are different from one another, and transition timepoints of the clock signals P1, P2, P3 and P4 are also different from one another. More specifically, a time interval of the clock signal P1 at logic low level does not overlap with a time interval of the clock signal P2 at logic low level; a time interval of the clock signal P3 at logic low level does not overlap with a time interval of the clock signal P4 at logic low level; the time interval of the clock signal P2 at logic low level does not overlap with the time interval of the clock signal P4 at logic low level; and the time interval of the clock signal P1 at logic high level does not overlap with the time interval of the clock signal P3 at logic high level.

The input stage 110 includes input transistors MI1 and MI2. A first end of the input transistor MI1 receives an input voltage VDD. A second end and a control end of the input transistor MI1 are coupled to each other, and coupled to an input pad IN1 of the boosting stage 120_1. A first end of the input transistor MI2 receives the input voltage VDD. A second end and a control end of the input transistor MI2 are coupled to each other, and coupled to an input pad IN2 of the boosting stage 120_1. In addition, because the output stage 130 is driven by the clock signals P3 and P1 and outputs a positive boosting voltage VPP, the four-phase charge pump circuit 100 is substantially a positive charge pump circuit.

In the embodiment shown by FIG. 1A, the four-phase charge pump circuit 100 may include an even number of boosting stages 120_1 to 120_N, i.e., N is an even number greater than 1. The boosting stage 120_1 receives an input voltage VDD−$V_{TP}$ from the input stage 110, where $V_{TP}$ is a threshold voltage of the input transistors MI1 and MI2. The input voltage VDD−$V_{TP}$ of the boosting stage 120_1 may be boosted by the boosting stages 120_1 to 120_N stage by stage, and the boosting stage 120_N may provide an intermediate boosting voltage (not illustrated in FIG. 1A) to the output stage 130 via the input pads IN1 and IN2 of the output stage 130. An up branch output circuit inside the output stage 130 may be driven by the clock signal P3, and a down branch output circuit inside the output stage 130 may be driven by the clock signal P1. The output stage 130 may enhance a driving capability of the intermediate boosting voltage to generate the positive boosting voltage VPP, where the positive boosting voltage VPP may be VDD×(N+2)−$V_{TP}$.

Incidentally, in this invention, the number of the boosting stages 120_1 to 120_N included by the four-phase charge pump circuit 100 in the present embodiment may be adjusted according to different practical circuit designs, and the practical circuit designs are not limited by the invention. In other embodiments of the invention, the four-phase charge pump circuit 100 may also include an odd-number of boosting stages 120_1 to 120_N, i.e., N is an odd number greater than 1. In this case, the up branch output circuit inside the output stage 130 may be driven by the clock signal P1, and the down branch output circuit inside the output stage 130 may be driven by the clock signal P3.

With reference to FIG. 1B, a four-phase charge pump circuit 100B of FIG. 1B may also include an input stage 100B, a plurality of boosting stages 120_1 to 120N and an output stage 130B, where N is a positive integer greater than 1. The boosting stages 120_1 to 120_N of the four-phase charge pump circuit 100E of FIG. 1B are similar to the boosting stages 120_1 to 120_N of the four-phase charge pump circuit 100 of FIG. 1A, and can refer to the relevant descriptions above, which are not repeated hereinafter.

The four-phase charge pump circuit 100B of FIG. 1B differs form the four-phase charge pump circuit 100 of FIG. 1A in that: the input stage 110B is driven by the clock signals P2 and P4 shown by FIG. 2, and an internal circuit scheme of the input stage 110B is similar to that of the even-numbered boosting stage (which will be described later). As such, the positive boosting voltage VPP of FIG. 1B is VDD×(N+2) to prevent the positive boosting voltage VPP from being influenced by the threshold voltage $V_{TP}$ of the input transistors MI1 and MI2 of FIG. 1A. In addition, another difference between the four-phase charge pump circuit 100B of FIG. 1B and the four-phase charge pump circuit 100 of FIG. 1A is that, the output stage 130B is driven by the four-phase clock signals P1, P2, P3 and P4 as shown by FIG. 2, and an internal circuit scheme of the output stage 130B is similar to the odd-numbered or the even-numbered boosting stage (which will be described later) so a performance loss caused by charge reflow during a switching period can be reduced. The internal circuit scheme of the output stage 130B can refer to the description of FIG. 3A and FIG. 3B, and the internal circuit scheme of the input stage 110B can refer to the description of FIG. 3D.

Figure 3A:
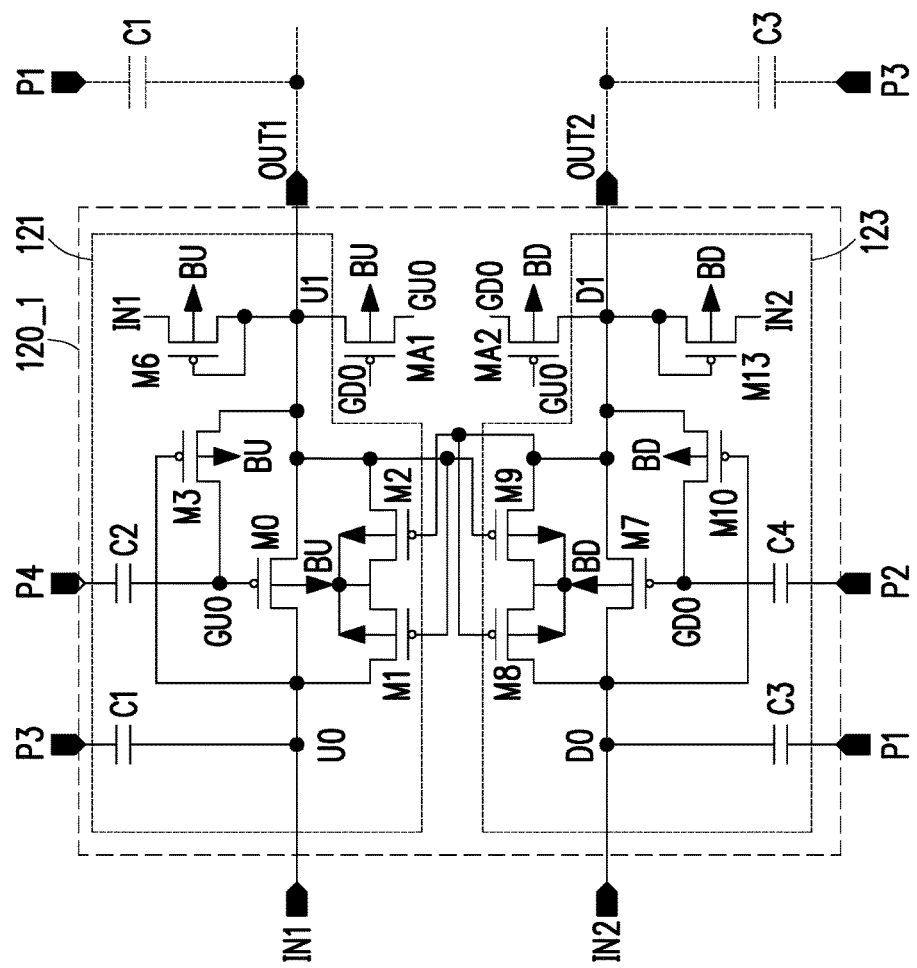
FIG. 3A is a schematic diagram illustrating an internal circuit scheme of the odd-numbered boosting stage in the embodiments of FIG. 1A and FIG. 1B according to an embodiment of the invention.

FIG. 3A is a schematic diagram illustrating an internal circuit scheme of the odd-numbered boosting stage in the embodiments of FIG. 1A and FIG. 1B according to an embodiment of the invention. With reference to FIG. 3A, FIG. 3A illustrates the internal circuit scheme of the boosting stages 120_1, 120_3, ..., or 120_(N−1). The odd-numbered boosting stage 120_1 is used as an example in the following description, and the rest of the odd-numbered boosting stages 120_3, ..., 120_(N−1) can be deduced from the above.

As shown in FIG. 3A, the boosting stage 120_1 includes an up branch charge pump 121 and a down branch charge pump 123. The up branch charge pump 121 includes a main pass transistor M0, a pre-charge transistor M3, two capacitors C1 and C2, two base transistors M1 and M2 and an initial transistor M6. A first end of the main pass transistor M0 serves as a first node U0 of the up branch charge pump 121, and a second end of the main pass transistor M0 serves as a second node U1 of the up branch charge pump 121. In this embodiment, the boosting stage 120_1 is a first boosting stage among the boosting stages 120_1 to 120_N, which can receive the input voltage VDD via the input pads IN1 and IN2. The first node U0 of the up branch charge pump 121 receives the input voltage VDD via the input pad IN1. The second node U1 of the up branch charge pump 121 is connected to the next boosting stage 120_2 via an output pad OUT1.

A first end and a second end of the pre-charge transistor M3 are coupled to a control end GU0 of the main pass transistor M0 and the second node U1 of the up branch charge pump 121 respectively, and a control end of the pre-charge transistor M3 is coupled to the first node U0 of the up branch charge pump 121. One end of the capacitor C2 is coupled to the control end GU0 of the main pass transistor M0, and another end of the capacitor C2 receives the clock signal P4. One end of the capacitor C1 is coupled to the first node U0 of the up branch charge pump 121, and another end of the capacitor C1 receives the clock signal P3.

First ends and bodies of the two base transistors M1 and M2 are commonly coupled to a body BU of the main pass transistor M0, and second ends of the two base transistors M1 and M2 are coupled to the first node U0 and the second node U1 of the up branch charge pump 121 respectively. A control end of the base transistor M1 is coupled to the second node U1 of the up branch charge pump 121, and a control end of the base transistor M2 is coupled to a second node U1 of the down branch charge pump 123. The base transistors M1 and M2 are switched to keep a potential at the body BU of the main pass transistor M0 at high base potential to reduce body effect. A first end and a second end of the initial transistor M6 are coupled to the first node U0 and the second node U1 of the up branch charge pump 121, i.e., the input pad IN1 and the output pad OUT1. A control end of the initial transistor M6 is coupled to its second end, and a body of the initial transistor M6 is connected to the body BU of the main pass transistor M0. The initial transistor M6 serves as a starter, and provides an initial potential energy at the second node U1 to start up a waveform of the boosting voltage output via the output pad OUT1. In the invention, the initial transistor M6 may be omitted in other exemplary embodiments.

Similarly, the down branch charge pump 123 includes a main pass transistor M7, a pre-charge transistor M10, two capacitors C3 and C4, two base transistors M8 and M9 and an initial transistor M13. A first end of the main pass transistor M7 serves as a first node D0 of the down branch charge pump 123, and a second end of the main pass transistor M7 serves as a second node D1 of the down branch charge pump 123. In this embodiment, the first node D0 of the down branch charge pump 123 receives the input voltage VDD via the input pad IN2. The second node D1 of the down branch charge pump 123 is connected to the next boosting stage 120_2 via an output pad OUT2.

A first end and a second end of the pre-charge transistor M10 are coupled to a control end GD0 of the main pass transistor M7 and the second node D1 of the down branch charge pump 123 respectively, and a control end of the pre-charge transistor M10 is coupled to the first node D0 of the down branch charge pump 123. One end of the capacitor C4 is coupled to the control end GD0 of the main pass transistor M7, and another end of the capacitor C4 receives the clock signal P2. One end of the capacitor C3 is coupled to the first node D0 of the down branch charge pump 123, and another end of the capacitor C3 receives the clock signal P1.

First ends and bodies of the two base transistors M8 and M9 are commonly coupled to a body BD of the main pass transistor M7, and second ends of the two base transistors M8 and M9 are coupled to the first node D0 and the second node D1 of the down branch charge pump 123 respectively. A control end of the base transistor M8 is coupled to the second node D1 of the down branch charge pump 123, and a control end of the base transistor M9 is coupled to the second node U1 of the up branch charge pump 121. The base transistors M8 and M9 are switched to keep a potential at the body BD of the main pass transistor M7 at high base potential to reduce body effect. A first end and a second end of the initial transistor M13 are respectively coupled to the first node D0 and the second node D1 of the down branch charge pump 123, i.e., the input pad IN2 and the output pad OUT2. A control end of the initial transistor M13 is coupled to its second end, and a body of the initial transistor M13 is connected to the body BD of the main pass transistor M7. The initial transistor M13 serves as a starter, and provides an initial potential energy at the second node D1 to start up a waveform of the boosting voltage output via the output pad OUT2. In the invention, the initial transistor MI3 may be omitted in other exemplary embodiments.

Figure 3B:
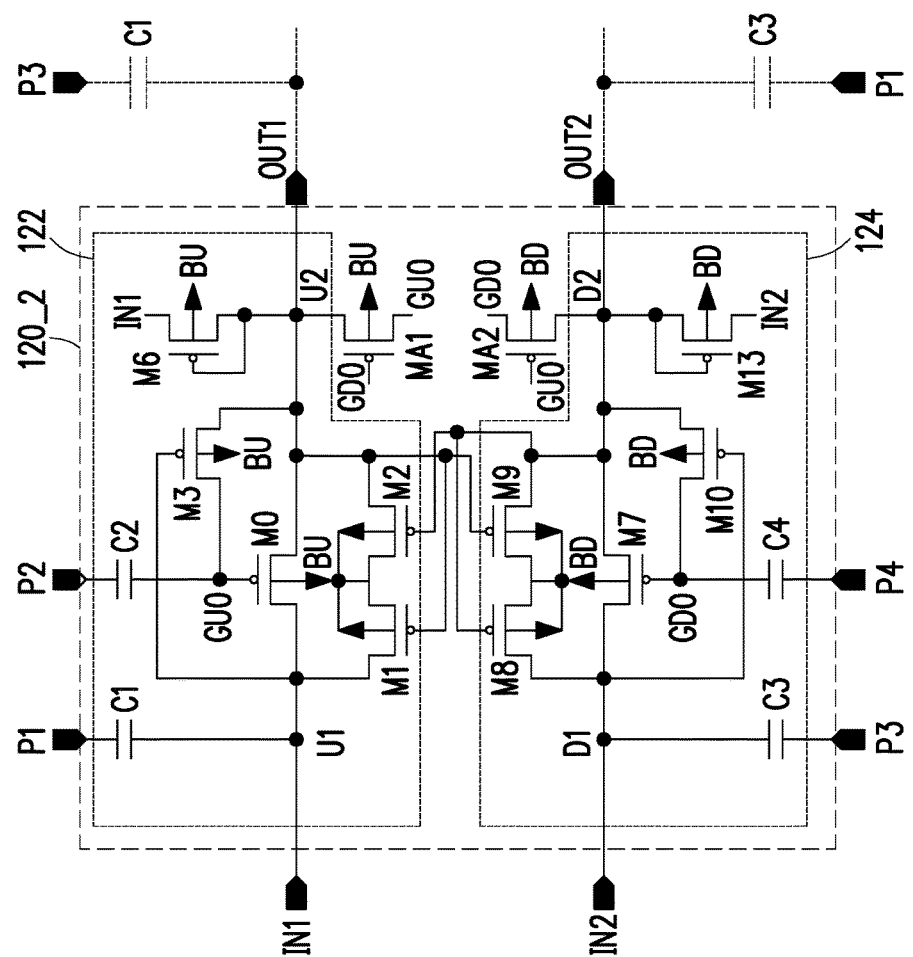
FIG. 3B is a schematic diagram illustrating an internal circuit scheme of the even-numbered boosting stage in the embodiments of FIG. 1A and FIG. 1B according to an embodiment of the invention.

FIG. 3B is a schematic diagram illustrating an internal circuit scheme of the even-numbered boosting stage in the embodiments of FIG. 1A and FIG. 1B according to an embodiment of the invention. With reference to FIG. 3B, FIG. 3B illustrates the internal circuit scheme of the even-numbered boosting stages 120_2, 120_4, ..., or 120_N. The even-numbered boosting stage 120_2 is used as an example in the following description, and the rest of the even-numbered boosting stages 120_4, ..., 120_N can be deduced from the above.

As shown in FIG. 3B, the boosting stage 120_2 includes an up branch charge pump 122 and a down branch charge pump 124. The up branch charge pump 122 includes a main pass transistor M0, a pre-charge transistor M3, two capacitors C1 and C2, two base transistors M1 and M2 and an initial transistor M6. A first end of the main pass transistor M0 serves as a first node U1 of the up branch charge pump 122, and a second end of the main pass transistor M0 serves as a second node U2 of the up branch charge pump 122. In this embodiment, the first node U1 of the up branch charge pump 122 is connected to the previous boosting stage 120_1 via an input pad IN1. The second node U2 of the up branch charge pump 122 is connected to the next boosting stage 120_3 via an output pad OUT1.

A first end and a second end of the pre-charge transistor M3 are coupled to a control end GU0 of the main pass transistor M0 and the second node U2 of the up branch charge pump 122 respectively, and a control end of the pre-charge transistor M3 is coupled to the first node U1 of the up branch charge pump 122. One end of the capacitor C2 is coupled to the control end GU0 of the main pass transistor M0, and another end of the capacitor C2 receives the clock signal P2. One end of the capacitor C1 is coupled to the first node U1 of the up branch charge pump 122, and another end of the capacitor C1 receives the clock signal P1.

First ends and bodies of the two base transistors M1 and M2 are commonly coupled to a body BU of the main pass transistor M0, and second ends of the two base transistors M1 and M2 are coupled to the first node U1 and the second node U2 of the up branch charge pump 122 respectively. A control end of the base transistor M1 is coupled to the second node U2 of the up branch charge pump 122, and a control end of the base transistor M2 is coupled to a second node D2 of the down branch charge pump 124. The base transistors M1 and M2 are switched to keep a potential at the body BU of the main pass transistor M0 at high base potential to reduce body effect. A first end and a second end of the initial transistor M6 are respectively coupled to the first node U1 and the second node U2 of the up branch charge pump 122, i.e., the input pad IN1 and the output pad OUT1. A control end of the initial transistor M6 is coupled to its second end, and a body of the initial transistor M6 is connected to the body BU of the main pass transistor M0. The initial transistor M6 serves as a starter, and provides an initial potential energy at the second node U2 to start up a waveform of the boosting voltage output via the output pad OUT1. In the invention, the initial transistor M6 may be omitted in other exemplary embodiments.

Similarly, the down branch charge pump 124 includes a main pass transistor M7, a pre-charge transistor M10, two capacitors C3 and C4, two base transistors M8 and M9 and an initial transistor M13. A first end of the main pass transistor M7 serves as a first node D1 of the down branch charge pump 124, and a second end of the main pass transistor M7 serves as a second node D2 of the down branch charge pump 124. In this embodiment, the first node D1 of the down branch charge pump 124 is connected to the previous boosting stage 120_1 via an input pad IN2. The second node D2 of the down branch charge pump 124 is connected to the next boosting stage 120_3 via an output pad OUT2.

A first end and a second end of the pre-charge transistor M10 are coupled to a control end GD0 of the main pass transistor M7 and the second node D2 of the down branch charge pump 124 respectively, and a control end of the pre-charge transistor M10 is coupled to the first node D1 of the down branch charge pump 124. One end of the capacitor C4 is coupled to the control end GD0 of the main pass transistor M7, and another end of the capacitor C4 receives the clock signal P4. One end of the capacitor C3 is coupled to the first node D1 of the down branch charge pump 124, and another end of the capacitor C3 receives the clock signal P3.

First ends and bodies of the two base transistors M8 and M9 are commonly coupled to a body BD of the main pass transistor M7, and second ends of the two base transistors M8 and M9 are coupled to the first node D1 and the second node D2 of the down branch charge pump 124 respectively. A control end of the base transistor M8 is coupled to the second node D2 of the down branch charge pump 124, and a control end of the base transistor M9 is coupled to the second node U2 of the up branch charge pump 122. The base transistors M8 and M9 are switched to keep a potential at the body BD of the main pass transistor M7 at high base potential to reduce body effect. A first end and a second end of the initial transistor M13 are respectively coupled to the first node D1 and the second node D2 of the down branch charge pump 124, i.e., the input pad IN2 and the output pad OUT2. A control end of the initial transistor M13 is coupled to its second end, and a body of the initial transistor M13 is connected to the body BD of the main pass transistor M7. The initial transistor M13 serves as a starter, and provides an initial potential energy at the second node D2 to start up a waveform of the boosting voltage output via the output pad OUT2. In the invention, the initial transistor M13 may be omitted in other exemplary embodiments.

In particular, at least one boosting stage among the boosting stages 120_1 to 120_N shown in FIG. 1A and FIG. 1B may further include two auxiliary start-up transistors, which may be used to prevent a situation where the four-phase charge pump circuits 100 and 100B cannot be started normally. In an embodiment of the invention, two auxiliary start-up transistors may be disposed in each of last few boosting stages among the boosting stages 120_1 to 120_N, so as to prevent the situation where the four-phase charge pump circuits 100 and 100B cannot be started normally due to the start-up failure on said last few boosting stages. However, the invention is not limited in this regard. Nonetheless, for descriptive convenience, the following description are provided by using each of the boosting stages 120_1 to 120_N including two auxiliary start-up transistors as example.

Based on that, as shown by FIG. 3A, the boosting stage 120_1 further includes two auxiliary start-up transistors MA1 and MA2. A first end and a second end of the auxiliary start-up transistor MA1 are coupled to the control end GU0 of the main pass transistor M0 and the second node U1 of the up branch charge pump 121 respectively. A control end of the auxiliary start-up transistor MA1 is coupled to the control end GD0 of the main pass transistor M7 of the down branch charge pump 123, and a body of the auxiliary start-up transistor MA1 is coupled to the body BU of the main pass transistor M0 of the up branch charge pump 121. In addition, a first end and a second end of the auxiliary start-up transistor MA2 are coupled to the control end GD0 of the main pass transistor M7 and the second node D1 of the down branch charge pump 123 respectively. A control end of the auxiliary start-up transistor MA2 is coupled to the control end GU0 of the main pass transistor M0 of the up branch charge pump 121, and a body of the auxiliary start-up transistor MA2 is coupled to the body BD of the main pass transistor M7 of the down branch charge pump 123.

Similarly, as shown in FIG. 3B, the boosting stage 120_2 further includes two auxiliary start-up transistors MA1 and MA2. A first end and a second end of the auxiliary start-up transistor MA1 are coupled to the control end GU0 of the main pass transistor M0 and the second node U2 of the up branch charge pump 122 respectively. A control end of the auxiliary start-up transistor MA1 is coupled to the control end GD0 of the main pass transistor M7 of the down branch charge pump 124, and a body of the auxiliary start-up transistor MA1 is coupled to the body BU of the main pass transistor M0 of the up branch charge pump 122. A first end and a second end of the auxiliary start-up transistor MA2 are coupled to the control end GD0 of the main pass transistor M7 and the second node D2 of the down branch charge pump 124 respectively. A control end of the auxiliary start-up transistor MA2 is coupled to the control end GU0 of the main pass transistor M0 of the up branch charge pump 122, and a body of the auxiliary start-up transistor MA2 is coupled to the body BD of the main pass transistor M7 of the down branch charge pump 124.

In the embodiments of FIG. 1A, FIG. 1B, FIG. 3A and FIG. 3B, the main pass transistors M0 and M7, the pre-charge transistors M3 and M10, the base transistors M1, M2, M8 and M9, the initial transistors M6 and M13 and the auxiliary start-up transistors MA1 and MA2 of the boosting stages 120_1 to 120_N are P-channel metal oxide semiconductor field effect transistors (MOSFET).

Figure 3C:
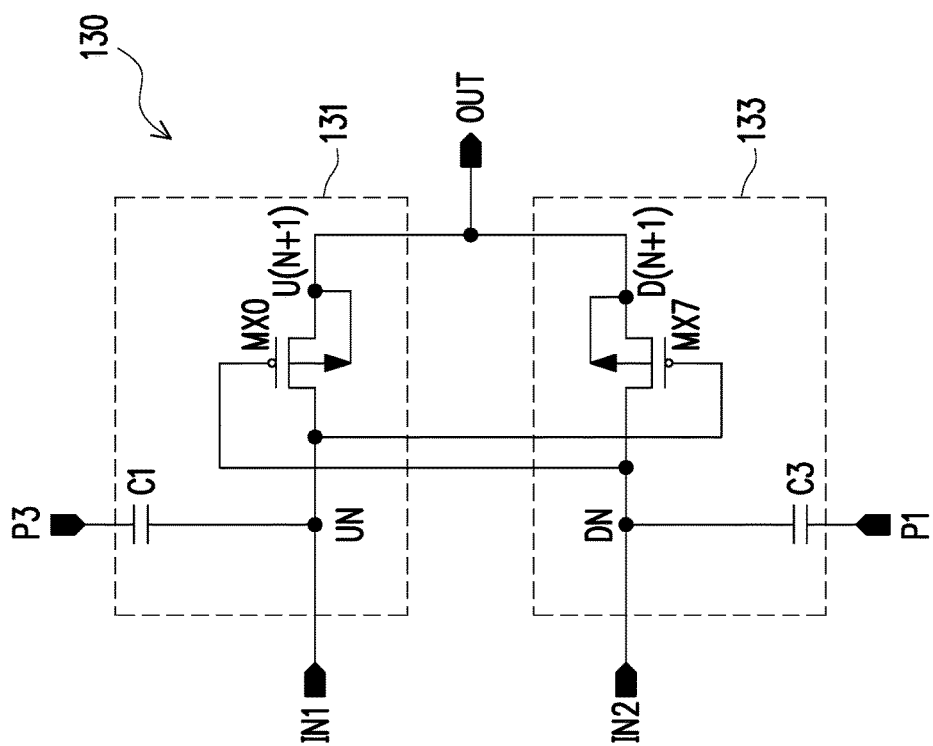
FIG. 3C is a schematic diagram illustrating an internal circuit scheme of the output stage in the embodiment of FIG. 1A according to an embodiment of the invention.

FIG. 3C is a schematic diagram illustrating an internal circuit scheme of the output stage in the embodiment of FIG. 1A according to an embodiment of the invention. As shown by FIG. 3C, the output stage 130 includes an up branch output circuit 131 and a down branch output circuit 133. The up branch output circuit 131 includes a main pass transistor MX0 and the capacitor C1. A first end of the main pass transistor MX0 serves as a first node UN of the up branch output circuit 131. A second end of the main pass transistor MX0 serves as a second node U(N+1) of the up branch output circuit 131, and a control end of the main pass transistor MX0 is coupled to a first node DN of the down branch output circuit 133. In this embodiment, the first node UN of the up branch output circuit 131 is coupled to the previous boosting stage 120_N via the input pad IN1. The second node U(N+1) of the up branch output circuit 131 outputs the boosting voltage VPP via the output pad OUT. One end of the capacitor C1 is coupled to the first node UN, and another end of the capacitor C1 receives the clock signal P3.

Similarly, the down branch output circuit 133 includes a main pass transistor MX7 and the capacitor C3. A first end of the main pass transistor MX7 serves as the first node DN of the down branch output circuit 133. A second end of the main pass transistor MX7 serves as a second node D(N+1) of the down branch output circuit 133, and a control end of the main pass transistor MX7 is coupled to the first node UN of the up branch output circuit 131. In this embodiment, the first node DN of the down branch output circuit 133 is coupled to the previous boosting stage 120_N via the input pad IN2. The second node D(N+1) of the down branch output circuit 133 outputs the boosting voltage VPP via the output pad OUT. One end of the capacitor C3 is coupled to the first node DN, and another end of the capacitor C3 receives the clock signal P1.

In the embodiment of FIG. 3C, the main pass transistors MX0 and MX7 are the P-channel MOSFETs. Because the boosting voltage VPP is the positive voltage, the four-phase charge pump circuit 100 is the positive charge pump circuit.

Figure 3D:
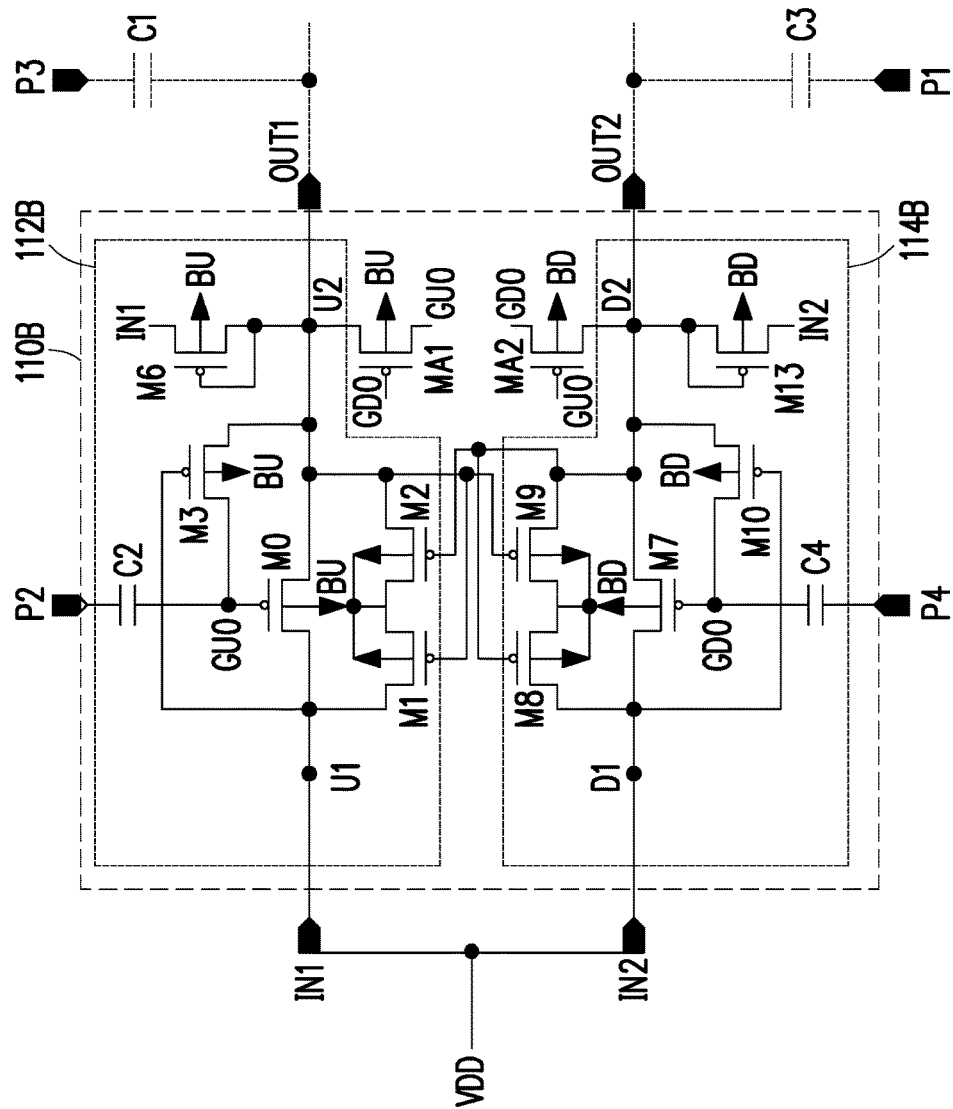
FIG. 3D is a schematic diagram illustrating an internal circuit scheme of the input stage in the embodiment of FIG. 1B according to an embodiment of the invention.

FIG. 3D is a schematic diagram illustrating an internal circuit scheme of the input stage in the embodiment of FIG. 1B according to an embodiment of the invention. As shown by FIG. 3D, the input stage 110B includes an up branch input circuit 112B and a down branch input circuit 114B. The circuit scheme of the up branch input circuit 112B is similar to that of the up branch charge pump 122 of FIG. 3B with the only difference being: the capacitor C1 is disposed at the first node U1 of the up branch charge pump 122, but no capacitor is disposed at the first node U1 of the up branch input circuit 112B. Similarly, the circuit scheme of the down branch input circuit 114B is similar to that of the down branch charge pump 124 of FIG. 3B with the only difference being: the capacitor C3 is disposed at the first node D1 of the down branch charge pump 124, but no capacitor is disposed at the first node D1 of the down branch input circuit 114B.

In addition, the input stage 110B also further includes two auxiliary start-up transistors MA1 and MA2. A first end and a second end of the auxiliary start-up transistor MA1 are coupled to the control end GU0 of the main pass transistor M0 and the second node U2 of the up branch input circuit 112B respectively. A control end of the auxiliary start-up transistor MA1 is coupled to the control end GD0 of the main pass transistor M7 of the down branch input circuit 114B, and a body of the auxiliary start-up transistor MA1 is coupled to the body BU of the main pass transistor M0 of the up branch input circuit 112B. In addition, a first end and a second end of the auxiliary start-up transistor MA2 are coupled to the control end GD0 of the main pass transistor M7 and the second node D2 of the down branch input circuit 114B respectively. A control end of the auxiliary start-up transistor MA2 is coupled to the control end GU0 of the main pass transistor M0 of the up branch input circuit 112B, and a body of the auxiliary start-up transistor MA2 is coupled to the body BD of the main pass transistor M7 of the down branch input circuit 114B.

In the embodiment of FIG. 3D, the main pass transistors M0 and M7, the pre-charge transistors M3 and M10, the base transistors M1, M2, M8 and M9, the initial transistors M6 and M13 and the auxiliary start-up transistors MA1 and MA2 are P-channel metal oxide semiconductor field effect transistors (MOSFET).

Operations of the input stage 110B of FIG. 3D are described as follows. For illustrative convenience, potentials of the input voltage VDD at high potential and the ground voltage at low potential are used as an example, and the capacitors C1 and C3 of the boosting stage 120_1 are illustrated at the output pads OUT1 and OUT2 of FIG. 3D respectively. Referring to FIG. 2 and FIG. 3D together, first of all, in a time interval T0, the clock signals P1 and P4 are at low potential, and the clock signals P2 and P3 are at high potential. In the down branch input circuit 114B, the main pass transistor M7 is at turned-on state and the pre-charge transistor M10 is at cut-off state, and thus the input voltage VDD at the first node D1 is transmitted to the second node D2. In the up branch input circuit 112B, the pre-charge transistor M3 is at turned-on state and the main pass transistor M0 is at cut-off state, so as to prevent the charge at the second node U2 of the up branch input circuit 112B from recharging to the first node U1. At this time, the voltage at the second node U2 is an intermediate boosting voltage 2VDD.

In a time interval T1, the clock signal P4 is switched from low potential to high potential; the clock signal P1 is kept at low potential; and the clock signals P2 and P3 are kept at high potential. In the down branch input circuit 114B, the voltage at the control end GD0 of the main pass transistor M7 is switched from an intermediate boosting voltage VDD to the intermediate boosting voltage 2VDD such that the main pass transistor M7 is cut off.

In a time interval T2, the clock signal P3 is switched from high potential to low potential; the clock signal P1 is kept at low potential; and the clock signals P2 and P4 are kept at high potential. In the up branch input circuit 112B, the voltage at the second node U2 may be changed from the intermediate boosting voltage 2VDD to the intermediate boosting voltage VDD by the clock signal P3. In addition, based on the pre-charge transistor M3 at turned-on state, the control end GU0 of the main pass transistor M0 can follow the voltage at the second node U2 to be changed to the intermediate boosting voltage VDD, and eventually turn off the pre-charge transistor M3.

In a time interval T3, the clock signal P1 is switched from low potential to high potential; the clock signal P3 is kept at low potential; and the clock signals P2 and P4 are kept at high potential. In the down branch input circuit 114B, the voltage at the second node D2 may be changed to the intermediate boosting voltage 2VDD by the clock signal P1, and the pre-charge transistor M10 is turned on. In addition, the voltage at the control end GD0 of the main pass transistor M7 can follow the voltage at the second node D2 through the pre-charge transistor M10, so as to prevent the charge at the second node D2 of the down branch input circuit 114B from recharging to the first node D1 in response to the main pass transistor M7 being turned on.

Next, in a time interval T4, the clock signal P2 is switched from high potential to low potential; the clock signal P3 is kept at low potential; and the clock signals P1 and P4 are kept at high potential. In the up branch input circuit 112B, the control end GU0 of the main pass transistor M0 is changed from the intermediate boosting voltage VDD to low potential such that the main pass transistor M0 is turned on. Accordingly, the input voltage VDD at the first node U1 is transmitted to the second node U2.

In a time interval T5, the clock signal P2 is switched from low potential to high potential; the clock signal P3 is kept at low potential; and the clock signals P1 and P4 are kept at high potential. In the up branch input circuit 112B, the voltage at the control end GU0 of the main pass transistor M0 is switched from low potential to the intermediate boosting voltage VDD such that the main pass transistor M0 is cut off.

In a time interval T6, the clock signal P1 is switched from high potential to low potential; the clock signal P3 is kept at low potential; and the clock signals P2 and P4 are kept at high potential. In the down branch input circuit 112B, the voltage at the second node D2 may be changed from the intermediate boosting voltage 2VDD to the intermediate boosting voltage VDD by the clock signal P1. In addition, based on the pre-charge transistor M10 at turned-on state, the control end GD0 of the main pass transistor M7 can follow the voltage at the second node D2 to be changed to the intermediate boosting voltage VDD, and eventually turn off the pre-charge transistor M10.

In a time interval T7, the clock signal P3 is switched from low potential to high potential; the clock signal P1 is kept at low potential; and the clock signals P2 and P4 are kept at high potential. In the up branch input circuit 112B, the voltage at the second node U2 may be changed to the intermediate boosting voltage 2VDD by the clock signal P3, and the pre-charge transistor M3 is turned on. In addition, the voltage at the control end GU0 of the main pass transistor M0 can follow the voltage at the second node U2 through the pre-charge transistor M3, so as to prevent the charge at the second node U2 of the up branch input circuit 112B from recharging to the first node U1 in response to the main pass transistor M0 being turned on.

Next, in a time interval T8, the clock signal P4 is switched from high potential to low potential; the clock signal P1 is kept at low potential; and the clock signals P2 and P3 are kept at high potential. In the down branch input circuit 114B, the control end GD0 of the main pass transistor M7 is changed from the intermediate boosting voltage VDD to low potential such that the main pass transistor M7 is turned on. Accordingly, the input voltage VDD at the first node D1 is transmitted to the second node D2.

Operations of the boosting stage 120_1 of FIG. 3A are described below with reference to the input stage 110B of the four-phase charge pump circuit 100B of FIG. 1B. For illustrative convenience, the potentials of the input voltage VDD at high potential and the ground voltage at low potential are used as an example, and the capacitors C1 and C3 of the next boosting stage 120_2 are illustrated at the output pads OUT1 and OUT2 of FIG. 3A respectively. Referring to FIG. 1B, FIG. 2 and FIG. 3A together, first of all, in a time interval T0, the clock signals P1 and P4 are at low potential, and the clock signals P2 and P3 are at high potential. In the up branch charge pump 121, the main pass transistor M0 is at turned-on state and the pre-charge transistor M3 is at cut-off state, and thus the intermediate boosting voltage 2VDD at the first node U0 is transmitted to the second node U1. In the down branch charge pump 123, the pre-charge transistor M10 is at turned-on state and the main pass transistor M7 is at cut-off state, so as to prevent the charge at the second node D1 of the down branch charge pump 123 from recharging to the first node D0. At this time, the voltage at the first node D0 is charged to the intermediate boosting voltage VDD through the input stage 110B.

In a time interval T1, the clock signal P4 is switched from low potential to high potential; the clock signal P1 is kept at low potential; and the clock signals P2 and P3 are kept at high potential. In the up branch charge pump 121, the control end GU0 of the main pass transistor M0 is switched from VDD to 2VDD such that the main pass transistor M0 is cut off.

In a time interval T2, the clock signal P3 is switched from high potential to low potential; the clock signal P1 is kept at low potential; and the clock signals P2 and P4 are kept at high potential. In the up branch charge pump 121, the pre-charge transistor M3 is turned on. In the down branch charge pump 123, the voltage at the second node D1 may be changed from an intermediate boosting voltage 3VDD to the intermediate boosting voltage 2VDD by the clock signal P3 and may be transmitted to the next boosting stage 120_2 via the output pad OUT2. In addition, based on the pre-charge transistor M10 at turned-on state, the voltage at the control end GD0 of the main pass transistor M7 can follow the voltage at the second node D1 to be changed to the intermediate boosting voltage 2VDD.

In a time interval T3, the clock signal P1 is switched from low potential to high potential; the clock signal P3 is kept at low potential; and the clock signals P2 and P4 are kept at high potential. In the up branch charge pump 121, the voltage at the second node U1 may be changed from the intermediate boosting voltage 2VDD to the intermediate boosting voltage 3VDD by the clock signal P1 and may be transmitted to the next boosting stage 120_2 via the output pad OUT1. In addition, the voltage at the control end GU0 of the main pass transistor M0 can follow the voltage at the second node U1 through the pre-charge transistor M3, so as to prevent the charge at the second node U1 of the up branch charge pump 121 from recharging to the first node U0 in response to the main pass transistor M0 being turned on. On the other hand, in the down branch charge pump 123, the pre-charge transistor M10 is turned off and the voltage at the control end GD0 of the main pass transistor M7 is kept at the intermediate boosting voltage 2VDD.

It is worth noting that, in the time interval T3, although the voltage at the control end GU0 of the main pass transistor M0 can follow the voltage at the second node U1 through the pre-charge transistor M3, actually, the voltage at the control end GU0 of the main pass transistor M0 may not be able to follow the voltage at the second node U1 in time so that the main pass transistor M0 cannot be kept at cut-off state (because the speed for turning on the pre-charge transistor M3 is overly slow). Accordingly, the charge at the second node U1 of the up branch charge pump 121 would recharge to the first node U0 such that the voltage at the control end of the pre-charge transistor M3 is increased to turn off the pre-charge transistor M3. Consequently, the main pass transistor M0 cannot be turned off. In this case, because the up branch charge pump 121 cannot function properly, the charge pump circuit 100B is unable to provide the pump voltage with normal voltage level. To avoid the above situation, the auxiliary start-up transistor MA1 may be used to ensure that the main pass transistor M0 is kept at cut-off state.

Specifically, in the time interval T3, the voltage at the control end GD0 of the main pass transistor M7 is kept at the intermediate boosting voltage 2VDD, and the voltage at the second node U1 is changed from the intermediate boosting voltage 2VDD to the intermediate boosting voltage 3VDD. In this way, the auxiliary start-up transistor MA1 may be turned on to transmit the voltage at the second node U1 to the control end GU0 of the main pass transistor M0 so as to ensure that the main pass transistor M0 is kept at cut-off state.

Next, in a time interval T4, the clock signal P2 is switched from high potential to low potential; the clock signal P3 is kept at low potential; and the clock signals P1 and P4 are kept at high potential. In the down branch charge pump 123, because the voltage at the control end GD0 of the main pass transistor M7 is switched from the intermediate boosting voltage 2VDD to the intermediate boosting voltage VDD such that the main pass transistor M7 is turned on, the intermediate boosting voltage 2VDD at the first node D0 is transmitted to the second node D1. In addition, the control end of the auxiliary start-up transistor MA1 is coupled to the control end GD0 of the main pass transistor M7 to be at low potential. Therefore, the auxiliary start-up transistor MA1 is still kept at turned-on state so the voltage at the control end GU0 of the main pass transistor M0 can follow the voltage at the second node U1 to ensure that the main pass transistor M0 is kept at the cut-off state.

In a time interval T5, the clock signal P2 is switched from low potential to high potential; the clock signal P3 is kept at low potential; and the clock signals P1 and P4 are kept at high potential. In the down branch charge pump 123, the voltage at the control end GD0 of the main pass transistor M7 is switched from the intermediate boosting voltage VDD to the intermediate boosting voltage 2VDD such that the main pass transistor M7 is cut off.

In a time interval T6, the clock signal P1 is switched from high potential to low potential; the clock signal P3 is kept at low potential; and the clock signals P2 and P4 are kept at high potential. In the down branch charge pump 123, the pre-charge transistor M10 is turned on. In the up branch charge pump 121, the voltage at the second node U1 may be changed from the intermediate boosting voltage 3VDD to the intermediate boosting voltage 2VDD by the clock signal P1, so as to turn off the auxiliary start-up transistor MA1. In addition, based on the pre-charge transistor M3 at turned-on state, the voltage at the control end GU0 of the main pass transistor M0 can follow the voltage at the second node U1 to be changed to the intermediate boosting voltage 2VDD.

In a time interval T7, the clock signal P3 is switched from low potential to high potential; the clock signal P1 is kept at low potential; and the clock signals P2 and P4 are kept at high potential. In the down branch charge pump 123, the voltage at the second node D1 may be changed to the intermediate boosting voltage 3VDD by the clock signal P3. In addition, the voltage at the control end GD0 of the main pass transistor M7 can follow the voltage at the second node D1 through the pre-charge transistor M10, so as to prevent the charge at the second node D1 of the down branch charge pump 123 from recharging to the first node D0 in response to the main pass transistor M7 being turned on. On the other hand, in the up branch charge pump 121, the pre-charge transistor M3 is turned off and the voltage at the control end GU0 of the main pass transistor M0 is kept at the intermediate boosting voltage 2VDD.

Similarly, in the time interval T7, although the voltage at the control end GD0 of the main pass transistor M7 can follow the voltage at the second node D1 through the pre-charge transistor M10, actually, the voltage at the control end GD0 of the main pass transistor M7 may not be able to follow the voltage at the second node D1 in time so that the main pass transistor M7 cannot be kept at cut-off state (because the speed for turning on the pre-charge transistor M10 is overly slow). Accordingly, the charge at the second node D1 of the down branch charge pump 123 would recharge to the first node D0 such that the voltage at the control end of the pre-charge transistor M10 is increased to turn off the pre-charge transistor M10. Consequently, the main pass transistor M7 cannot be turned off. In this case, because the down branch charge pump 123 cannot function properly, the charge pump circuit 100B is unable to provide the pump voltage with normal voltage level. To avoid the above situation, the auxiliary start-up transistor MA2 may be used to ensure that the main pass transistor M7 is kept at cut-off state.

Specifically, in the time interval T7, the voltage at the control end GU0 of the main pass transistor M0 is kept at the intermediate boosting voltage 2VDD, and the voltage at the second node D1 is changed from the intermediate boosting voltage 2VDD to the intermediate boosting voltage 3VDD. Therefore, the auxiliary start-up transistor MA2 may be turned on to transmit the voltage at the second node D1 to the control end GD0 of the main pass transistor M7 so as to ensure that the main pass transistor M7 is kept at cut-off state.

Next, in a time interval T8, the clock signal P4 is switched from high potential to low potential; the clock signal P1 is kept at low potential; and the clock signals P2 and P3 are kept at high potential. In the up branch charge pump 121, because the voltage at the control end GU0 of the main pass transistor M0 is switched from the intermediate boosting voltage 2VDD to the intermediate boosting voltage VDD such that the main pass transistor M0 is turned on, the input voltage 2VDD at the first node U0 is transmitted to the second node U1. Since the control end of the auxiliary start-up transistor MA2 is coupled to the control end GU0 of the main pass transistor M0 to be VDD, the auxiliary start-up transistor MA2 is still kept at turned-on state so the voltage at the control end GD0 of the main pass transistor M7 can follow the voltage at the second node D1 to ensure that the main pass transistor M7 is kept at the cut-off state.

Operations of the boosting stage 120_2 are described below starting from the time interval T4. For illustrative convenience, the capacitors C1 and C3 of the next boosting stage 120_3 are illustrated at the output pads OUT1 and OUT2 of FIG. 3B respectively. Referring to FIG. 2 and FIG. 3B together, in a time interval T4, the voltage at the first node U1 of the up branch charge pump 122 is the intermediate boosting voltage 3VDD; the voltage at the first node D1 of the down branch charge pump 124 is the intermediate boosting voltage 2VDD; the clock signal P2 is changed from high potential to low potential; the clock signal P3 is kept at low potential; and the clock signals P1 and P4 are kept at high potential. In the up branch charge pump 122, the main pass transistor M0 is turned on, and the pre-charge transistor M3 is at cut-off state, and thus the input voltage 3VDD at the first node U1 is transmitted to the second node U2. In the down branch charge pump 124, the main pass transistor M7 is at cut-off state and the pre-charge transistor M10 is turned on, so as to prevent the charge at the second node D2 of the down branch charge pump 124 from recharging to the first node D1.

In a time interval T5, the clock signal P2 is switched from low potential to high potential; the clock signal P3 is kept at low potential; and the clock signals P1 and P4 are kept at high potential. In the up branch charge pump 122, the main pass transistor M0 is cut off.

In a time interval T6, the clock signal P1 is switched from high potential to low potential; the clock signal P3 is kept at low potential; and the clock signals P2 and P4 are kept at high potential. In the up branch charge pump 122, the pre-charge transistor M3 is turned on. In the down branch charge pump 124, the voltage at the second node D2 may be changed from an intermediate boosting voltage 4VDD to the intermediate boosting voltage 3VDD by the clock signal P1 and may be transmitted to the next boosting stage 120_3 via the output pad OUT2. In addition, based on the pre-charge transistor M10 at turned-on state, the voltage at the control end GD0 of the main pass transistor M7 can follow the voltage at the second node D2 to be changed to the intermediate boosting voltage 3VDD.

In a time interval T7, the clock signal P3 is switched from low potential to high potential; the clock signal P1 is kept at low potential; and the clock signals P2 and P4 are kept at high potential. In the up branch charge pump 122, the voltage at the second node U2 may be changed from the intermediate boosting voltage 3VDD to the intermediate boosting voltage 4VDD by the clock signal P3 and may be transmitted to the next boosting stage 120_3 via the output pad OUT1. In addition, the voltage at the control end GU0 of the main pass transistor M0 can follow the voltage at the second node U2 through the pre-charge transistor M3, so as to prevent the charge at the second node U2 of the up branch charge pump 122 from recharging to the first node U1 in response to the main pass transistor M0 being turned on. On the other hand, in the down branch charge pump 124, the voltage at the first node D1 may be changed from the intermediate boosting voltage 2VDD to the intermediate boosting voltage 3VDD by the clock signal P3. Therefore, the pre-charge transistor M10 is cut off and the voltage at the control end GD0 of the main pass transistor M7 is kept at the intermediate boosting voltage 3VDD.

It is worth noting that, in the time interval T7, although the voltage at the control end GU0 of the main pass transistor M0 can follow the voltage at the second node U2 through the pre-charge transistor M3, actually, the voltage at the control end GU0 of the main pass transistor M0 may not be able to follow the voltage at the second node U2 in time so that the main pass transistor M0 cannot be kept at cut-off state (because the speed for turning on the pre-charge transistor M3 is overly slow). Accordingly, the charge at the second node U2 of the up branch charge pump 122 would recharge to the first node U1 such that the voltage at the control end of the pre-charge transistor M3 is increased to turn off the pre-charge transistor M3. Consequently, the main pass transistor M0 cannot be turned off. In this case, because the up branch charge pump 122 cannot function properly, the charge pump circuit 100B is unable to provide the pump voltage with normal voltage level. To avoid the above situation, the auxiliary start-up transistor MA1 may be used to ensure that the main pass transistor M0 is kept at cut-off state.

Specifically, in the time interval T7, the voltage at the control end GD0 of the main pass transistor M7 is kept at the intermediate boosting voltage 3VDD, and the voltage at the second node U2 is changed from the intermediate boosting voltage 3VDD to the intermediate boosting voltage 4VDD. In this way, the auxiliary start-up transistor MA1 may be turned on to transmit the voltage at the second node U2 to the control end GU0 of the main pass transistor M0 so as to ensure that the main pass transistor M0 is kept at cut-off state.

Next, in a time interval T8, the clock signal P4 is switched from high potential to low potential; the clock signal P1 is kept at low potential; and the clock signals P2 and P3 are kept at high potential. In the down branch charge pump 124, because the voltage at the control end GD0 of the main pass transistor M7 is changed from 3VDD to 2VDD such that the main pass transistor M7 is turned on, the voltage 3VDD at the first node D1 is transmitted to the second node D2. In addition, the control end of the auxiliary start-up transistor MA1 is coupled to the control end GD0 of the main pass transistor M7 to be at 2VDD potential. Therefore, the auxiliary start-up transistor MA1 is still kept at turned-on state so the voltage at the control end GU0 of the main pass transistor M0 can follow the voltage at the second node U2 to ensure that the main pass transistor M0 is kept at the cut-off state.

In a time interval T9, the clock signal P4 is switched from low potential to high potential; the clock signal P1 is kept at low potential; and the clock signals P2 and P3 are kept at high potential. In the down branch charge pump 124, the voltage at the control end GD0 of the main pass transistor M7 is switched from the intermediate boosting voltage 2VDD to the intermediate boosting voltage 3VDD such that the main pass transistor M7 is cut off.

In a time interval T10, the clock signal P3 is switched from high potential to low potential; the clock signal P1 is kept at low potential; and the clock signals P2 and P4 are kept at high potential. In the down branch charge pump 124, the pre-charge transistor M10 is turned on. In the up branch charge pump 122, the voltage at the second node U2 may be changed from the intermediate boosting voltage 4VDD to the intermediate boosting voltage 3VDD by the clock signal P3, so as to turn off the auxiliary start-up transistor MA1. In addition, based on the pre-charge transistor M3 at turned-on state, the voltage at the control end GU0 of the main pass transistor M0 can follow the voltage at the second node U2 to be changed to the intermediate boosting voltage 3VDD.

In a time interval T11, the clock signal P1 is switched from low potential to high potential; the clock signal P3 is kept at low potential; and the clock signals P2 and P4 are kept at high potential. In the down branch charge pump 124, the voltage at the second node D2 may be changed to the intermediate boosting voltage 4VDD by the clock signal P1. In addition, the voltage at the control end GD0 of the main pass transistor M7 can follow the voltage at the second node D2 through the pre-charge transistor M10, so as to prevent the charge at the second node D2 of the down branch charge pump 124 from recharging to the first node D1 in response to the main pass transistor M7 being turned on. On the other hand, in the up branch charge pump 122, the voltage at the first node U1 may be changed to the intermediate boosting voltage 3VDD by the clock signal P1. Therefore, the pre-charge transistor M3 is cut off and the voltage at the control end GU0 of the main pass transistor M0 is kept at the intermediate boosting voltage 3VDD.

Similarly, in the time interval T11, although the voltage at the control end GD0 of the main pass transistor M7 can follow the voltage at the second node D2 through the pre-charge transistor M10, actually, the voltage at the control end GD0 of the main pass transistor M7 may not be able to follow the voltage at the second node D2 in time so that the main pass transistor M7 cannot be kept at cut-off state (because the speed for turning on the pre-charge transistor M10 is overly slow). Accordingly, the charge at the second node D2 of the down branch charge pump 124 would recharge to the first node D1 such that the voltage at the control end of the pre-charge transistor M10 is increased to turn off the pre-charge transistor M10. Consequently, the main pass transistor M7 cannot be turned off. In this case, because the down branch charge pump 124 cannot function properly, the charge pump circuit 100B is unable to provide the pump voltage with normal voltage level. To avoid the above situation, the auxiliary start-up transistor MA2 may be used to ensure that the main pass transistor M7 is kept at cut-off state.

Specifically, in the time interval T11, the voltage at the control end GU0 of the main pass transistor M0 is kept at the intermediate boosting voltage 3VDD, and the voltage at the second node D2 is changed from the intermediate boosting voltage 3VDD to the intermediate boosting voltage 4VDD. Therefore, the auxiliary start-up transistor MA2 may be turned on to transmit the voltage at the second node D2 to the control end GD0 of the main pass transistor M7 so as to ensure that the main pass transistor M7 is kept at cut-off state.

Next, in a time interval T12, the clock signal P2 is switched from high potential to low potential; the clock signal P3 is kept at low potential; and the clock signals P1 and P4 are kept at high potential. In the up branch charge pump 122, because the voltage at the control end GU0 of the main pass transistor M0 is changed from the intermediate boosting voltage 3VDD to the intermediate boosting voltage 2VDD such that the main pass transistor M0 is turned on, the intermediate boosting voltage 3VDD at the first node U1 is transmitted to the second node U2. Since the control end of the auxiliary start-up transistor MA2 is coupled to the control end GU0 of the main pass transistor M0 to be at the intermediate boosting voltage 2VDD, the auxiliary start-up transistor MA2 is still kept at turned-on state so the voltage at the control end GD0 of the main pass transistor M7 can follow the voltage at the second node D2 to ensure that the main pass transistor M7 is kept at the cut-off state.

Operations of the up branch output circuit 131 and the down branch output circuit 133 of the output stage 130 of FIG. 3C are described as follows. The main pass transistor MX0 of the up branch output circuit 131 may be turned on when the clock signal P1 is at low potential and may transmit the intermediate boosting voltage (N+2)VDD of the up branch charge pump 122 of the boosting stage 120_N from the first node UN to the second node U(N+1) as the boosting voltage VPP. Here, the intermediate boosting voltage (N+2)VDD is (N+2) times the input voltage VDD. In addition, the main pass transistor MX7 of the down branch output circuit 133 may be turned on when the clock signal P3 is at low potential and may transmit the intermediate boosting voltage (N+2)VDD of the down branch charge pump 124 of the boosting stage 120_N from the first node DN to the second node D(N+1) as the boosting voltage VPP.

Figure 4A:
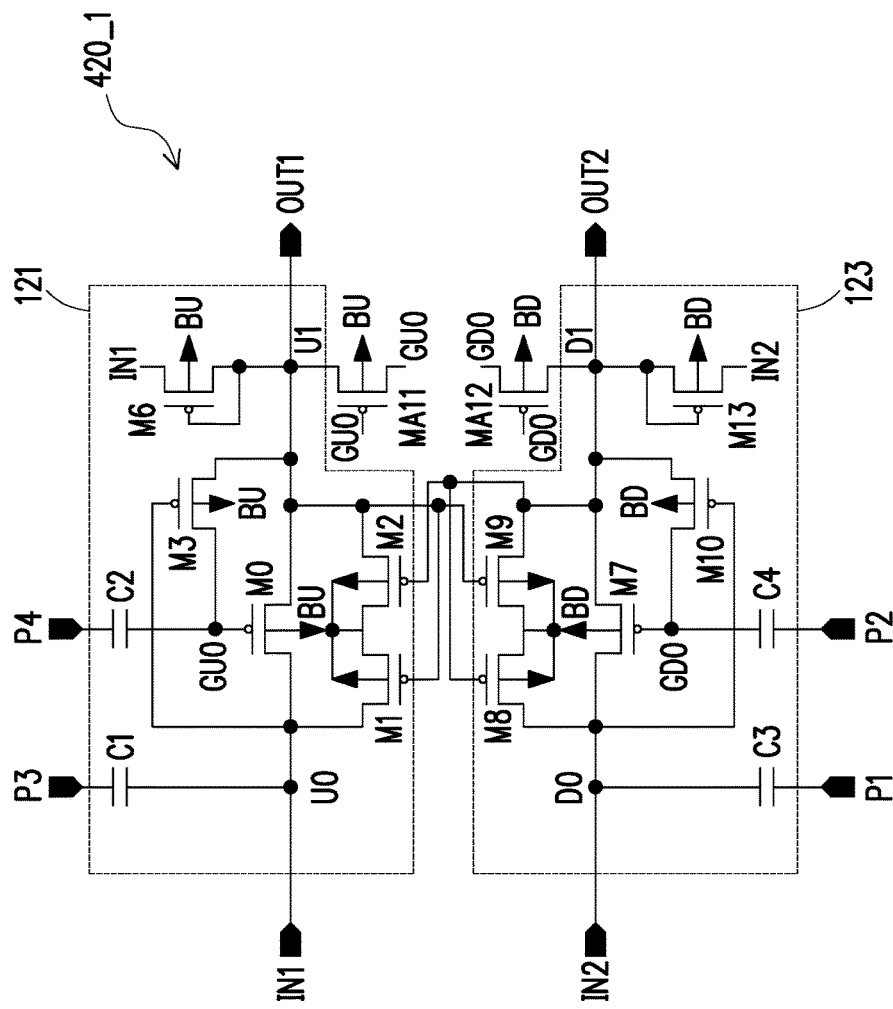
FIG. 4A is a schematic diagram illustrating an internal circuit scheme of the odd-numbered boosting stage in the embodiments of FIG. 1A and FIG. 1B according to another embodiment of the invention.
Figure 4B:
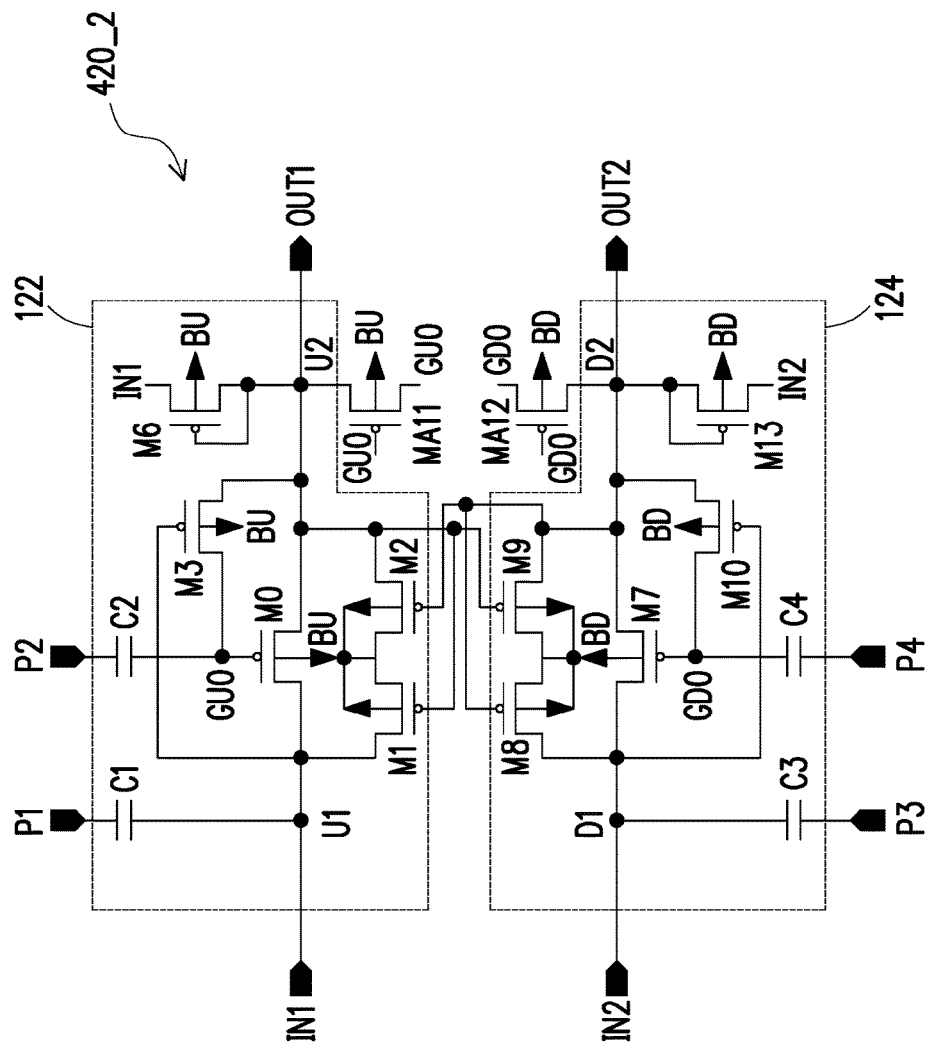
FIG. 4B is a schematic diagram illustrating an internal circuit scheme of the even-numbered boosting stage in the embodiments of FIG. 1A and FIG. 1B according to another embodiment of the invention.

Referring to FIG. 4A and FIG. 4B together, FIG. 4A is a schematic diagram illustrating an internal circuit scheme of the odd-numbered boosting stage in the embodiments of FIG. 1A and FIG. 1B according to another embodiment of the invention, and FIG. 4B is a schematic diagram illustrating an internal circuit scheme of the even-numbered boosting stage in the embodiments of FIG. 1A and FIG. 1B according to another embodiment of the invention. Exemplary embodiment of the odd-numbered boosting stage and the even-numbered boosting stage are described below using boosting stages 420_1 and 4202 respectively.

As shown in FIG. 4A, the boosting stage 420_1 may include an up branch charge pump 121, a down branch charge pump 123, and two auxiliary start-up transistors MA11 and MA12. Architectures of the up branch charge pump 121, the down branch charge pump 123 and the auxiliary start-up transistors MA11 and MA12 in FIG. 4A are similar to those of the up branch charge pump 121, the down branch charge pump 123 and the auxiliary start-up transistors MA1 and MA2 in FIG. 3A. The only difference is: a control end of the auxiliary start-up transistor MA11 of FIG. 4A is coupled to a control end GU0 of the main pass transistor M0 of the up branch charge pump 121, whereas the control end of the auxiliary start-up transistor MA1 of FIG. 3A is coupled to the control end GD0 of the main pass transistor M7 of the down branch charge pump 123; and a control end of the auxiliary start-up transistor MA12 of FIG. 4A is coupled to a control end GD0 of the main pass transistor M7 of the down branch charge pump 123, whereas the control end of the auxiliary start-up transistor MA2 of FIG. 3A is coupled to the control end GU0 of the main pass transistor M0 of the up branch charge pump 121. As similar to the operations of the auxiliary start-up transistors MA1 and MA2 of FIG. 3A, the auxiliary start-up transistors MA11 and MA12 of FIG. 4A can respectively ensure that the main pass transistors M0 and M7 can be turned on and turned off normally. Enough teaching, suggestion, and implementation illustration for the operations of the boosting stage 420_1 of FIG. 4A can be obtained from the descriptions for FIG. 1A to FIG. 3A, which are not repeated hereinafter.

Similarly, the boosting stage 420_2 shown by FIG. 4B may include an up branch charge pump 122, a down branch charge pump 124 and two auxiliary start-up transistors MA11 and MA12. Architectures of the up branch charge pump 122, the down branch charge pump 124 and the auxiliary start-up transistors MA11 and MA12 in FIG. 4B are similar to those of the up branch charge pump 122, the down branch charge pump 124 and the auxiliary start-up transistors MA1 and MA2 in FIG. 3B. The only difference is: a control end of the auxiliary start-up transistor MA11 of FIG. 4B is coupled to a control end GU0 of the main pass transistor M0 of the up branch charge pump 122, whereas the control end of the auxiliary start-up transistor MA1 of FIG. 3B is coupled to the control end GD0 of the main pass transistor M7 of the down branch charge pump 124; and a control end of the auxiliary start-up transistor MA12 of FIG. 4B is coupled to a control end GD0 of the main pass transistor M7 of the down branch charge pump 124, whereas the control end of the auxiliary start-up transistor MA2 of FIG. 3B is coupled to the control end GU0 of the main pass transistor M0 of the up branch charge pump 122. As similar to the operations of the auxiliary start-up transistors MA1 and MA2 of FIG. 3B, the auxiliary start-up transistors MA11 and MA12 of FIG. 4B can respectively ensure that the main pass transistors M0 and M7 can be turned on and turned off normally. Enough teaching, suggestion, and implementation illustration for the operations of the boosting stage 420_2 of FIG. 4B can be obtained from the descriptions for FIG. 1A to FIG. 3B, which are not repeated hereinafter.

Figure 5A:
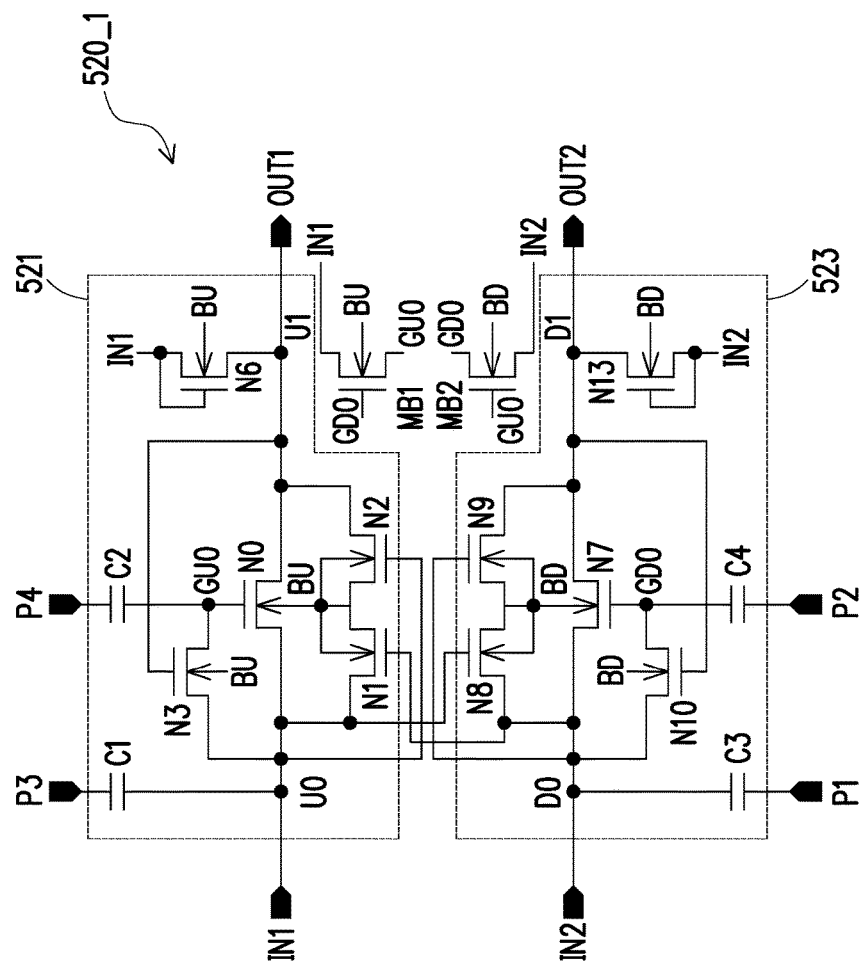
FIG. 5A is a schematic diagram illustrating an internal circuit scheme of the odd-numbered boosting stage in the embodiments of FIG. 1A and FIG. 1B according to yet another embodiment of the invention.
Figure 5B:
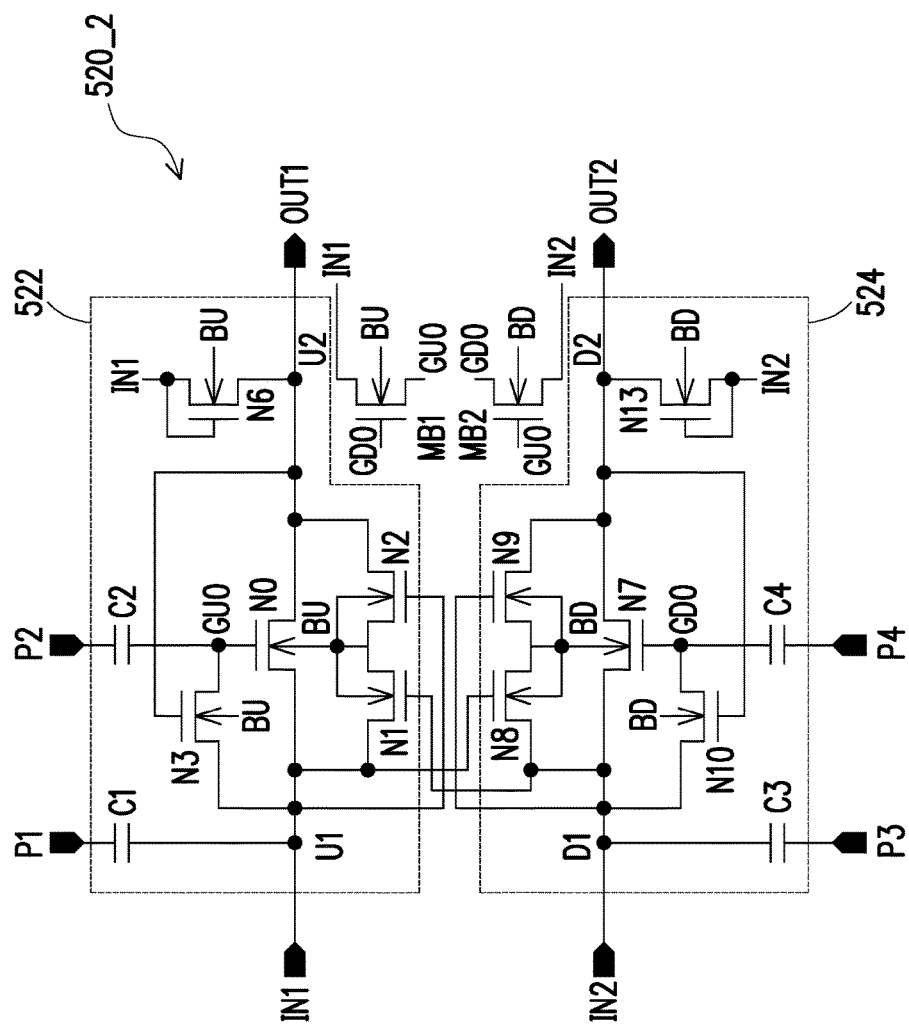
FIG. 5B is a schematic diagram illustrating an internal circuit scheme of the even-numbered boosting stage in the embodiments of FIG. 1A and FIG. 1B according to yet another embodiment of the invention.

The boosting stages in each of the foregoing embodiments are implemented by using the P-channel MOSFETs, but the invention is not limited thereto. A specific embodiment of implementing the boosting stages 120_1 to 120_N of FIGS. 1A and 1B using N-channel MOSFETs will be described below. Referring to FIG. 5A and FIG. 5B, FIG. 5A is a schematic diagram illustrating an internal circuit scheme of the odd-numbered boosting stage in the embodiments of FIG. 1A and FIG. 1B according to yet another embodiment of the invention, and FIG. 5B is a schematic diagram illustrating an internal circuit scheme of the even-numbered boosting stage in the embodiments of FIG. 1A and FIG. 1B according to yet another embodiment of the invention. Exemplary embodiment of the odd-numbered boosting stage and the even-numbered boosting stage are described below using boosting stages 520_1 and 520_2 respectively.

As shown in FIG. 5A, the boosting stage 520_1 includes an up branch charge pump 521, a down branch charge pump 523, and two auxiliary start-up transistors MB1 and MB2. The up branch charge pump 521 includes a main pass transistor N0, a pre-charge transistor N3, two capacitors C1 and C2, two base transistors N1 and N2 and an initial transistor N6. A first end of the main pass transistor N0 serves as a first node U0 of the up branch charge pump 521, and a second end of the main pass transistor N0 serves as a second node U1 of the up branch charge pump 521. In this embodiment, the boosting stage 520_1 is a first boosting stage, which can receive an input voltage VDD via input pads IN1 and IN2. Accordingly, the first node U0 of the up branch charge pump 521 receives the input voltage VDD via the input pad IN1, and the second node U1 of the up branch charge pump 521 is connected to the next boosting stage 520_2 via the output pad OUT1.

A first end and a second end of the pre-charge transistor N3 are coupled to a control end GU0 of the main pass transistor N0 and the first node U0 of the up branch charge pump 521 respectively, and a control end of the pre-charge transistor N3 is coupled to the first node U1 of the up branch charge pump 521. One end of the capacitor C2 is coupled to the control end GU0 of the main pass transistor N0, and another end of the capacitor C2 receives the clock signal P4. One end of the capacitor C1 is coupled to the first node U0 of the up branch charge pump 521, and another end of the capacitor C1 receives the clock signal P3.

First ends and bodies of the two base transistors N1 and N2 are commonly coupled to a body BU of the main pass transistor N0, and second ends of the two base transistors N1 and N2 are coupled to the first node U0 and the second node U1 of the up branch charge pump 521 respectively. A control end of the base transistor N2 is coupled to the first node U0 of the up branch charge pump 521, and a control end of the base transistor N1 is coupled to a first node D0 of the down branch charge pump 523. The base transistors N1 and N2 are switched to keep a potential at the body BU of the main pass transistor N0 at low base potential to reduce body effect. A first end and a second end of the initial transistor N6 are respectively coupled to the first node U0 and the second node U1 of the up branch charge pump 521, i.e., the input pad IN1 and the output pad OUT1. A control end of the initial transistor N6 is coupled to its first end, and a body of the initial transistor N6 is connected to the body BU of the main pass transistor N0. The initial transistor N6 serves as a starter, and provides an initial potential energy at the second node U1 to start up a waveform of the boosting voltage output via the output pad OUT1. In the invention, the initial transistor N6 may be omitted in other exemplary embodiments.

Similarly, the down branch charge pump 523 includes a main pass transistor N7, a pre-charge transistor N10, two capacitors C3 and C4, two base transistors N8 and N9 and an initial transistor N13. A first end of the main pass transistor N7 serves as a first node D0 of the down branch charge pump 523, and a second end of the main pass transistor N7 serves as a second node D1 of the down branch charge pump 523. In this embodiment, the first node D0 of the down branch charge pump 523 receives the input voltage VDD via the input pad IN2. The second node D1 of the down branch charge pump 523 is connected to the next boosting stage 520_2 via an output pad OUT2.

A first end and a second end of the pre-charge transistor N10 are coupled to a control end GD0 of the main pass transistor N7 and the first node D0 of the down branch charge pump 523 respectively, and a control end of the pre-charge transistor N10 is coupled to the second node D1 of the down branch charge pump 523. One end of the capacitor C4 is coupled to the control end GD0 of the main pass transistor N7, and another end of the capacitor C4 receives the clock signal P2. One end of the capacitor C3 is coupled to the first node D0 of the down branch charge pump 523, and another end of the capacitor C3 receives the clock signal P1.

First ends and bodies of the two base transistors N8 and N9 are commonly coupled to a body BD of the main pass transistor N7, and second ends of the two base transistors N8 and N9 are coupled to the first node D0 and the second node D1 of the down branch charge pump 523 respectively. A control end of the base transistor N9 is coupled to the first node D0 of the down branch charge pump 523, and a control end of the base transistor N8 is coupled to the first node U0 of the up branch charge pump 521. The base transistors N8 and N9 are switched to keep a potential at the body BD of the main pass transistor N7 at low base potential to reduce body effect. A first end and a second end of the initial transistor N13 are respectively coupled to the first node D0 and the second node D1 of the down branch charge pump 523, i.e., the input pad IN2 and the output pad OUT2. A control end of the initial transistor N13 is coupled to its first end, and a body of the initial transistor N13 is connected to the body BD of the main pass transistor N7. The initial transistor N13 serves as a starter, and provides an initial potential energy at the second node D1 to start up a waveform of the boosting voltage output via the output pad OUT2. In the invention, the initial transistor N13 may be omitted in other exemplary embodiments.

A first end and a second end of the auxiliary start-up transistor MB1 are coupled to the control end GU0 of the main pass transistor N0 and the first node U0 (i.e., the input pad IN1) of the up branch charge pump 521 respectively. A control end of the auxiliary start-up transistor MB1 is coupled to the control end GD0 of the main pass transistor N7 of the down branch charge pump 523, and a body of the auxiliary start-up transistor MB1 is coupled to the body BU of the main pass transistor N0 of the up branch charge pump 521. A first end and a second end of the auxiliary start-up transistor MB2 are coupled to the control end GD0 of the main pass transistor N7 and the first node D0 (i.e., the input pad IN2) of the down branch charge pump 523 respectively. A control end of the auxiliary start-up transistor MB2 is coupled to the control end GU0 of the main pass transistor N0 of the up branch charge pump 521, and a body of the auxiliary start-up transistor MB2 is coupled to the body BD of the main pass transistor N7 of the down branch charge pump 523. The auxiliary start-up transistors MB1 and MB2 can respectively ensure that the main pass transistors N0 and N7 can be turned on and turned off normally.

Further, as shown in FIG. 5B, the boosting stage 520_2 includes an up branch charge pump 522, a down branch charge pump 524, and two auxiliary start-up transistors MB1 and MB2. The up branch charge pump 522 includes a main pass transistor N0, a pre-charge transistor N3, two capacitors C1 and C2, two base transistors N1 and N2 and an initial transistor N6. A first end of the main pass transistor N0 serves as a first node U1 of the up branch charge pump 522, and a second end of the main pass transistor N0 serves as a second node U2 of the up branch charge pump 522. In this embodiment, the first node U1 of the up branch charge pump 522 is connected to the previous boosting stage 520_1 via an input pad IN1. The second node U2 of the up branch charge pump 522 is connected to the next boosting stage via an output pad OUT1.

A first end and a second end of the pre-charge transistor N3 are coupled to a control end GU0 of the main pass transistor N0 and the first node U1 of the up branch charge pump 522 respectively, and a control end of the pre-charge transistor N3 is coupled to the second node U2 of the up branch charge pump 522. One end of the capacitor C2 is coupled to the control end GU0 of the main pass transistor N0, and another end of the capacitor C2 receives the clock signal P2. One end of the capacitor C1 is coupled to the first node U1 of the up branch charge pump 522, and another end of the capacitor C1 receives the clock signal P1.

First ends and bodies of the two base transistors N1 and N2 are commonly coupled to a body BU of the main pass transistor N0, and second ends of the two base transistors N1 and N2 are coupled to the first node U1 and the second node U2 of the up branch charge pump 522 respectively. A control end of the base transistor N2 is coupled to the first node U1 of the up branch charge pump 522, and a control end of the base transistor N1 is coupled to a first node D1 of the down branch charge pump 524. The base transistors N1 and N2 are switched to keep a potential at the body BU of the main pass transistor N0 at low base potential to reduce body effect. A first end and a second end of the initial transistor N6 are respectively coupled to the first node U1 and the second node U2 of the up branch charge pump 522, i.e., the input pad IN1 and the output pad OUT1. A control end of the initial transistor N6 is coupled to its first end, and a body of the initial transistor N6 is connected to the body BU of the main pass transistor N0. The initial transistor N6 serves as a starter, and provides an initial potential energy at the second node U2 to start up a waveform of the boosting voltage output via the output pad OUT1. In the invention, the initial transistor N6 may be omitted in other exemplary embodiments.

Similarly, the down branch charge pump 524 includes a main pass transistor N7, a pre-charge transistor N10, two capacitors C3 and C4, two base transistors N8 and N9 and an initial transistor N13. A first end of the main pass transistor N7 serves as a first node D1 of the down branch charge pump 524, and a second end of the main pass transistor N7 serves as a second node D2 of the down branch charge pump 524. In this embodiment, the first node D1 of the down branch charge pump 524 is connected to the previous boosting stage 520_1 via an input pad IN2. The second node D2 of the down branch charge pump 524 is connected to the next boosting stage via an output pad OUT2.

A first end and a second end of the pre-charge transistor N10 are coupled to a control end GD0 of the main pass transistor N7 and the first node D1 of the down branch charge pump 524 respectively, and a control end of the pre-charge transistor N10 is coupled to the second node D2 of the down branch charge pump 524. One end of the capacitor C4 is coupled to the control end GD0 of the main pass transistor N7, and another end of the capacitor C4 receives the clock signal P4. One end of the capacitor C3 is coupled to the first node D1 of the down branch charge pump 524, and another end of the capacitor C3 receives the clock signal P3.

First ends and bodies of the two base transistors N8 and N9 are commonly coupled to a body BD of the main pass transistor N7, and second ends of the two base transistors N8 and N9 are coupled to the first node D1 and the second node D2 of the down branch charge pump 524 respectively. A control end of the base transistor N9 is coupled to the first node D1 of the down branch charge pump 524, and a control end of the base transistor N8 is coupled to the first node U1 of the up branch charge pump 522. The base transistors N8 and N9 are switched to keep a potential at the body BD of the main pass transistor N7 at low base potential to reduce body effect. A first end and a second end of the initial transistor N13 are respectively coupled to the first node D1 and the second node D2 of the down branch charge pump 524, i.e., the input pad IN2 and the output pad OUT2. A control end of the initial transistor N13 is coupled to its first end, and a body of the initial transistor N13 is connected to the body BD of the main pass transistor N7. The initial transistor N13 serves as a starter, and provides an initial potential energy at the second node D2 to start up a waveform of the boosting voltage output via the output pad OUT2. In the invention, the initial transistor N13 may be omitted in other exemplary embodiments.

A first end and a second end of the auxiliary start-up transistor MB1 are coupled to the control end GU0 of the main pass transistor N0 and the first node U1 (i.e., the input pad IN1) of the up branch charge pump 522 respectively. A control end of the auxiliary start-up transistor MB1 is coupled to the control end GD0 of the main pass transistor N7 of the down branch charge pump 524, and a body of the auxiliary start-up transistor MB1 is coupled to the body BU of the main pass transistor N0 of the up branch charge pump 522. A first end and a second end of the auxiliary start-up transistor MB2 are coupled to the control end GD0 of the main pass transistor N7 and the first node D1 (i.e., the input pad IN2) of the down branch charge pump 524 respectively. A control end of the auxiliary start-up transistor MB2 is coupled to the control end GU0 of the main pass transistor N0 of the up branch charge pump 522, and a body of the auxiliary start-up transistor MB2 is coupled to the body BD of the main pass transistor N7 of the down branch charge pump 524. The auxiliary start-up transistors MB1 and MB2 can respectively ensure that the main pass transistors N0 and N7 can be turned on and turned off normally.

Figure 6:
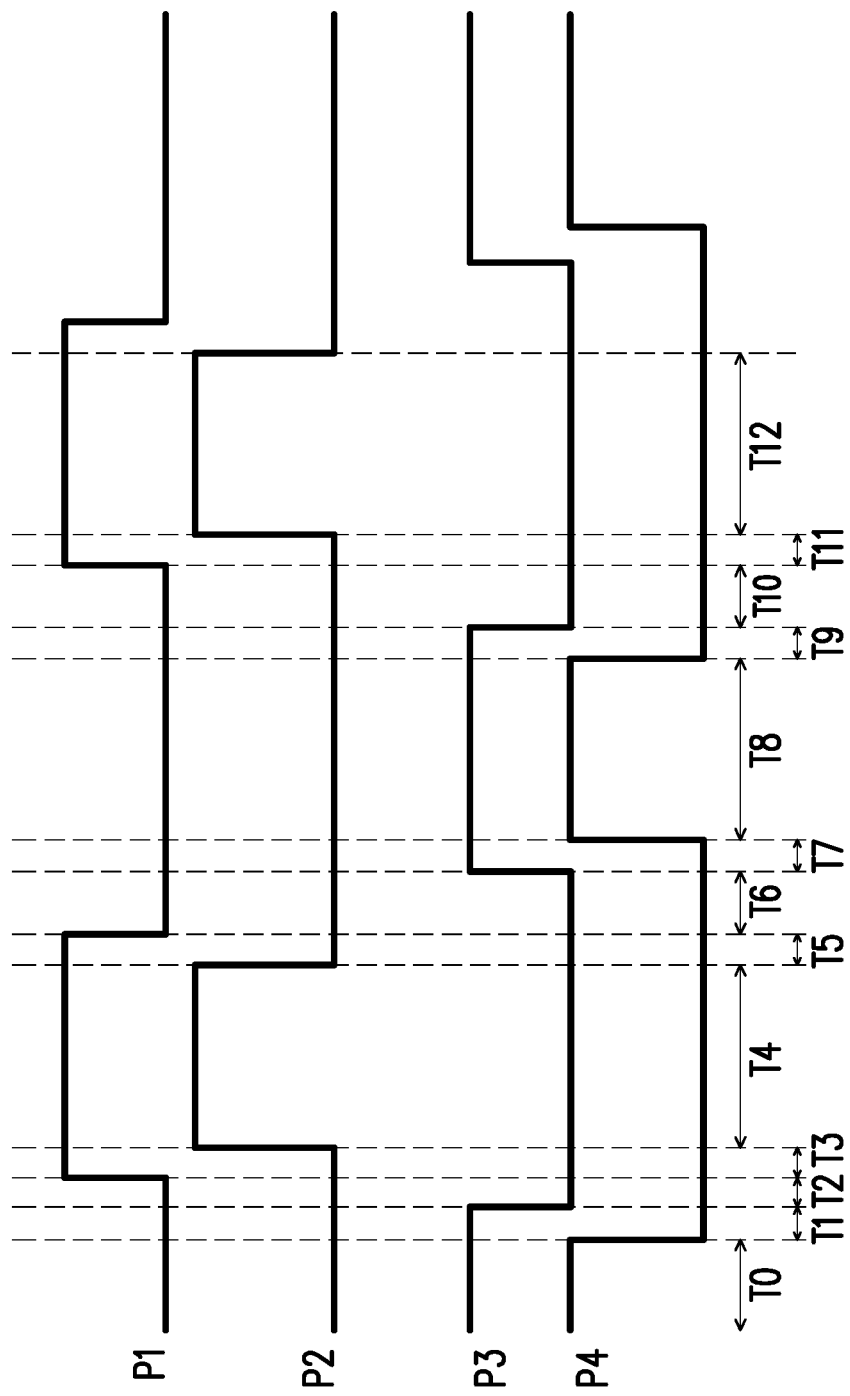
FIG. 6 illustrates a waveform diagram of a four-phase clock signal applied in the four-phase charge pump circuits of FIG. 1A and FIG. 1B according to another embodiment of the invention.

In the embodiments of FIG. 1A, FIG. 1B, FIG. 5A and FIG. 5B, the main pass transistors N0 and N7, the pre-charge transistors N3 and N10, the base transistors N1, N2, N8 and N9, the initial transistors N6 and N13 and the auxiliary start-up transistors MB1 and MB2 of the boosting stages are N-channel metal oxide semiconductor field effect transistors (MOSFET). Further, the waveform diagram of the four-phase clock signal shown by FIG. 6 is applicable to the four-phase charge pump circuits of FIG. 1A and FIG. 1B and the boosting stages 520_1 and 520_2 shown by FIG. 5A and FIG. 5B. In particular, phases of the clock signals P1, P2, P3 and P4 shown by FIG. 6 are different from one another, and transition timepoints of the clock signals P1, P2, P3 and P4 are also different from one another. More specifically, a time interval of the clock signal P1 at logic low level does not overlap with a time interval of the clock signal P2 at logic high level; a time interval of the clock signal P3 at logic low level does not overlap with a time interval of the clock signal P4 at logic high level; the time interval of the clock signal P2 at logic high level does not overlap with the time interval of the clock signal P4 at logic high level; and the time interval of the clock signal P1 at logic high level does not overlap with the time interval of the clock signal P3 at logic high level. Enough teaching, suggestion, and implementation illustration for the operations of the boosting stage 520_1 and 520_2 can be deduced from the descriptions for FIG. 1A to FIG. 3B, which are not repeated hereinafter.

Figure 7A:
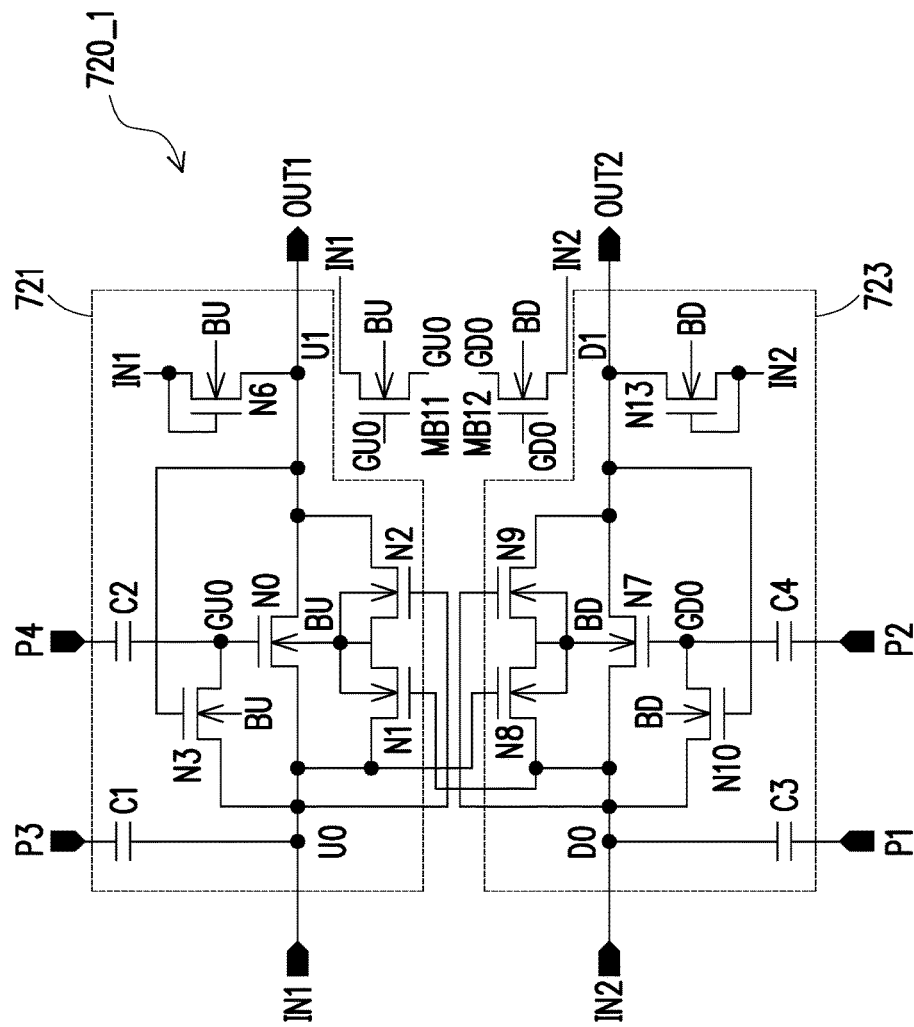
FIG. 7A is a schematic diagram illustrating an internal circuit scheme of the odd-numbered boosting stage in the embodiments of FIG. 1A and FIG. 1B according to yet another embodiment of the invention.
Figure 7B:
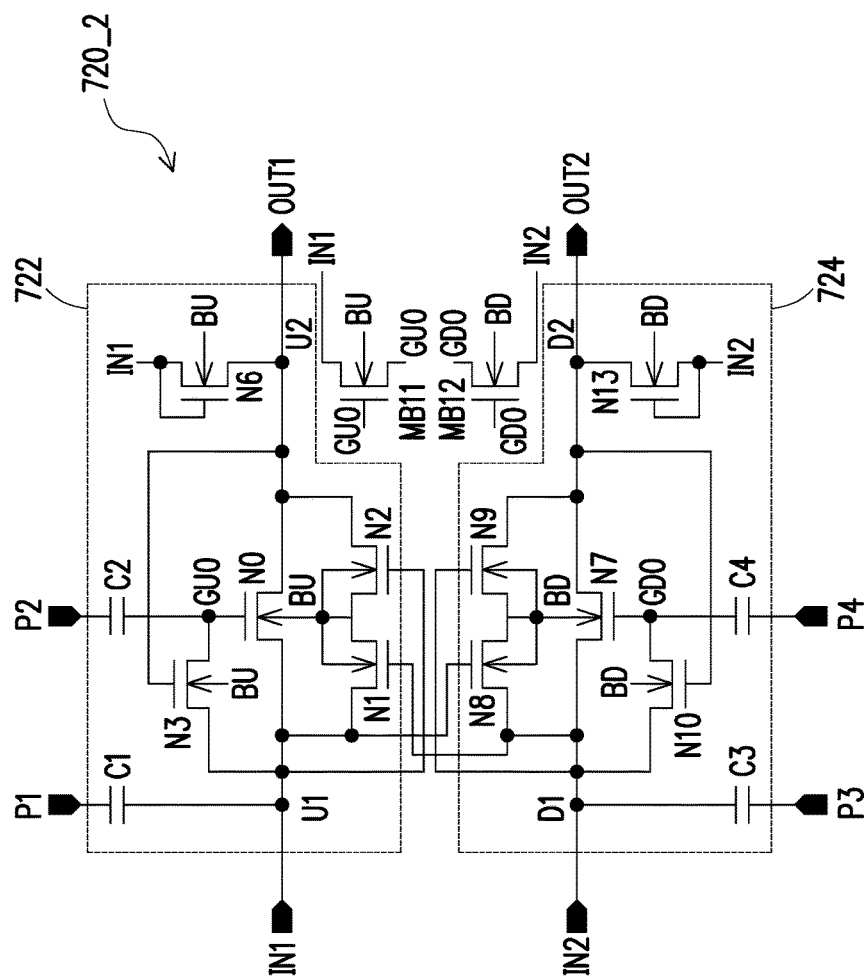
FIG. 7B is a schematic diagram illustrating an internal circuit scheme of the even-numbered boosting stage in the embodiments of FIG. 1A and FIG. 1B according to yet another embodiment of the invention.

FIG. 7A is a schematic diagram illustrating an internal circuit scheme of the odd-numbered boosting stage in the embodiments of FIG. 1A and FIG. 1B according to yet another embodiment of the invention, and FIG. 7B is a schematic diagram illustrating an internal circuit scheme of the even-numbered boosting stage in the embodiments of FIG. 1A and FIG. 1B according to yet another embodiment of the invention. Exemplary embodiment of the odd-numbered boosting stage and the even-numbered boosting stage are described below using boosting stages 720_1 and 720_2.

As shown in FIG. 7A, the boosting stage 720_1 may include an up branch charge pump 721, a down branch charge pump 723, and two auxiliary start-up transistors MB11 and MB12. Architectures of the up branch charge pump 721, the down branch charge pump 723 and the auxiliary start-up transistors MB11 and MB12 in FIG. 7A are similar to those of the up branch charge pump 521, the down branch charge pump 523 and the auxiliary start-up transistors MB1 and MB2 in FIG. 5A. The only difference is: a control end of the auxiliary start-up transistor MB11 of FIG. 7A is coupled to a control end GU0 of the main pass transistor N0 of the up branch charge pump 721, whereas the control end of the auxiliary start-up transistor MB1 of FIG. 5A is coupled to the control end GD0 of the main pass transistor N7 of the down branch charge pump 523; and a control end of the auxiliary start-up transistor MB12 of FIG. 7A is coupled to a control end GD0 of the main pass transistor N7 of the down branch charge pump 723, whereas the control end of the auxiliary start-up transistor MB2 of FIG. 5A is coupled to the control end GU0 of the main pass transistor N0 of the up branch charge pump 521. As similar to the operations of the auxiliary start-up transistors MB1 and MB2 of FIG. 5A, the auxiliary start-up transistors MB11 and MB12 of FIG. 7A can respectively ensure that the main pass transistors N0 and N7 can be turned on and turned off normally. Enough teaching, suggestion, and implementation illustration for the operations of the boosting stage 720_1 of FIG. 7A can be obtained from the descriptions for FIG. 1A to FIG. 3A and FIG. 5A, which are not repeated hereinafter.

Similarly, the boosting stage 720_2 shown by FIG. 7B may include an up branch charge pump 722, a down branch charge pump 724 and two auxiliary start-up transistors MB11 and MB12. Architectures of the up branch charge pump 722, the down branch charge pump 724 and the auxiliary start-up transistors MB11 and MB12 in FIG. 7B are similar to those of the up branch charge pump 522, the down branch charge pump 524 and the auxiliary start-up transistors MB1 and MB2 in FIG. 5B. The only difference is: a control end of the auxiliary start-up transistor MB11 of FIG. 7B is coupled to a control end GU0 of the main pass transistor N0 of the up branch charge pump 722, whereas the control end of the auxiliary start-up transistor MB1 of FIG. 5B is coupled to the control end GD0 of the main pass transistor N7 of the down branch charge pump 524; and a control end of the auxiliary start-up transistor MB12 of FIG. 7B is coupled to a control end GD0 of the main pass transistor N7 of the down branch charge pump 724, whereas the control end of the auxiliary start-up transistor MB2 of FIG. 5B is coupled to the control end GU0 of the main pass transistor N0 of the up branch charge pump 522. As similar to the operations of the auxiliary start-up transistors MB1 and MB2 of FIG. 5B, the auxiliary start-up transistors MB11 and MB12 of FIG. 7B can respectively ensure that the main pass transistors N0 and N7 can be turned on and turned off normally. Enough teaching, suggestion, and implementation illustration for the operations of the boosting stage 720_2 of FIG. 7B can be obtained from the descriptions for FIG. 1A to FIG. 3B and FIG. 5B, which are not repeated hereinafter.

In summary, the four-phase charge pump circuit according to the embodiments of the invention includes the auxiliary start-up transistors. The auxiliary start-up transistors can ensure that the main pass transistors of the four-phase charge pump circuit can be turned on and turned off normally such that the four-phase charge pump circuit can be started up properly to provide the pump voltage with normal voltage level.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A four-phase charge pump circuit, comprising:
   a plurality of boosting stages, driven by a four-phase clock signal, wherein each of the boosting stages comprises two branch charge pumps, and each of the two branch charge pumps comprises:
   a main pass transistor, a first end of the main pass transistor serving as a first node of the branch charge pump, a second end of the main pass transistor serving as a second node of the branch charge pump, wherein the first node and the second node of the branch charge pump are connected to a previous boosting stage and a next boosting stage of the boosting stage respectively;
   a pre-charge transistor, a first end and a second end of the pre-charge transistor being coupled to a control end of the main pass transistor and the second node of the branch charge pump respectively, and a control end of the pre-charge transistor being coupled to the first node of the branch charge pump; and
   two capacitors, coupled to the control end of the main pass transistor and the first node of the branch charge pump respectively,
   wherein at least one of the boosting stages further comprises:
   two auxiliary start-up transistors, a first end and a second end of each of the two auxiliary start-up transistors being coupled to the control end of the main pass transistor and the second node of one of the two branch charge pumps respectively, and a control end of each of the two auxiliary start-up transistors being coupled to the control end of the main pass transistor of one of the two branch charge pumps.

2. The four-phase charge pump circuit according to claim 1, wherein the first end of each of the two auxiliary start-up transistors is coupled to the control end of the main pass transistor of one of the two branch charge pumps, and the control end of each of the two auxiliary start-up transistors is coupled to the control end of the main pass transistor of another one of the two branch charge pumps.

3. The four-phase charge pump circuit according to claim 1, wherein
the first end and the control end of one of the two auxiliary start-up transistors are coupled to each other, and coupled to the control end of the main pass transistor of one of the two branch charge pumps; and
the first end and the control end of another one of the two auxiliary start-up transistors are coupled to each other, and coupled to the control end of the main pass transistor of another one of the two branch charge pumps.

4. The four-phase charge pump circuit according to claim 1, wherein each of the two branch charge pumps further comprises:
two base transistors, each of the two base transistors having a body, a control end, a first end and a second end, wherein the first ends and the bodies of the two base transistors are commonly coupled to a body of the main pass transistor, and the second ends of the two base transistors are coupled to the first node and the second node of the branch charge pump respectively,
wherein the control end of one base transistor with the second end connected to the first node is connected to the second node of one branch charge pump in which said one base transistor is located, and the control end of another base transistor is connected to the second node of another branch charge pump.

5. The four-phase charge pump circuit according to claim 4, wherein each of the two branch charge pumps further comprises:
an initial transistor, a first end and a second end of the initial transistor being coupled to the first node and the second node of the branch charge pump respectively, a control end of the initial transistor being coupled to the second end of the initial transistor, a body of the initial transistor being coupled to the body of the main pass transistor.

6. The four-phase charge pump circuit according to claim 5, wherein the main pass transistors, the pre-charge transistors, the auxiliary start-up transistors, the base transistors and the initial transistors of the boosting stages are P-channel metal oxide semiconductor field effect transistors.

7. The four-phase charge pump circuit according to claim 1, wherein for each of the boosting stages, the two capacitors of one branch charge pump receive two clock signals of the four-phase clock signal, and the two capacitors of another branch charge pump receive another two clock signals of the four-phase clock signal.

8. The four-phase charge pump circuit according to claim 1, wherein the four-phase clock signal comprises four clock signals, and transition timepoints of the four clock signals are different from one another.

9. A four-phase charge pump circuit, comprising:
a plurality of boosting stages, driven by a four-phase clock signal, wherein each of the boosting stages comprises two branch charge pumps, and each of the two branch charge pumps comprises:
a main pass transistor, a first end of the main pass transistor serving as a first node of the branch charge pump, and a second end of the main pass transistor serving as a second node of the branch charge pump, wherein the first node and the second node of the branch charge pump are connected to a previous boosting stage and a next boosting stage of the boosting stage respectively;
a pre-charge transistor, a first end and a second end of the pre-charge transistor being coupled to a control end of the main pass transistor and the first node of the branch charge pump respectively, and a control end of the pre-charge transistor being coupled to the second node of the branch charge pump; and
two capacitors, coupled to the control end of the main pass transistor and the first node of the branch charge pump respectively,
wherein at least one of the boosting stages further comprises:
two auxiliary start-up transistors, a first end and a second end of each of the two auxiliary start-up transistors being coupled to the control end of the main pass transistor and the first node of one of the two branch charge pumps respectively, and a control end of each of the two auxiliary start-up transistors being coupled to the control end of the main pass transistor of one of the two branch charge pumps.

10. The four-phase charge pump circuit according to claim 9, wherein the first end of each of the two auxiliary start-up transistors is coupled to the control end of the main pass transistor of one of the two branch charge pumps, and the control end of each of the two auxiliary start-up transistors is coupled to the control end of the main pass transistor of another one of the two branch charge pumps.

11. The four-phase charge pump circuit according to claim 9, wherein
the first end and the control end of one of the two auxiliary start-up transistors are coupled to each other, and coupled to the control end of the main pass transistor of one of the two branch charge pumps; and
the first end and the control end of another one of the two auxiliary start-up transistors are coupled to each other, and coupled to the control end of the main pass transistor of another one of the two branch charge pumps.

12. The four-phase charge pump circuit according to claim 9, wherein each of the two branch charge pumps further comprises:
two base transistors, each of the two base transistors having a body, a control end, a first end and a second end, wherein the first ends and the bodies of the two base transistors are commonly coupled to a body of the main pass transistor, and the second ends of the two base transistors are coupled to the first node and the second node of the branch charge pump respectively,
wherein the control end of one base transistor with the second end connected to the second node is connected to the first node of one branch charge pump in which said one base transistor is located, and the control end of another base transistor is connected to the first node of another branch charge pump.

13. The four-phase charge pump circuit according to claim 12, wherein each of the two branch charge pumps further comprises:
an initial transistor, a first end and a second end of the initial transistor being coupled to the first node and the second node of the branch charge pump respectively, a control end of the initial transistor being coupled to the first end of the initial transistor, and a body of the initial transistor being coupled to the body of the main pass transistor.

14. The four-phase charge pump circuit according to claim 13, wherein the main pass transistors, the pre-charge transistors, the auxiliary start-up transistors, the base transistors and the initial transistors of the boosting stages are N-channel metal oxide semiconductor field effect transistors.

15. The four-phase charge pump circuit according to claim 9, wherein for each of the boosting stages, the two capacitors of one branch charge pump receive two clock signals of the four-phase clock signal, and the two capacitors of another branch charge pump receive another two clock signals of the four-phase clock signal.

16. The four-phase charge pump circuit according to claim 9, wherein the four-phase clock signal comprises four clock signals, and transition timepoints of the four clock signals are different from one another.

* * * * *